(12) United States Patent
Davidson

(10) Patent No.: US 9,869,557 B2
(45) Date of Patent: *Jan. 16, 2018

(54) DETERMINING THE ACCURACY OF MAP DATA AND PROVIDING REPORTS FOR SAME

(71) Applicant: UNITED PARCEL SERVICE OF AMERICA, INC., Atlanta, GA (US)

(72) Inventor: Mark J. Davidson, Alpharetta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,116

(22) Filed: May 12, 2015

(65) Prior Publication Data

US 2015/0241223 A1 Aug. 27, 2015

Related U.S. Application Data

(63) Continuation-in-part of application No. 14/570,136, filed on Dec. 15, 2014, now Pat. No. 9,273,975, which is a continuation of application No. 14/169,682, filed on Jan. 31, 2014, now Pat. No. 8,942,920.

(51) Int. Cl.
*G01C 21/32* (2006.01)
*G06Q 10/08* (2012.01)

(52) U.S. Cl.
CPC ............ *G01C 21/32* (2013.01); *G06Q 10/08* (2013.01)

(58) Field of Classification Search
None
See application file for complete search history.

(56) References Cited

U.S. PATENT DOCUMENTS

| | | |
|---|---|---|
| 8,489,316 B1 | 7/2013 | Hedges et al. |
| 8,655,593 B1 | 2/2014 | Davidson |
| 8,725,407 B2 | 5/2014 | Hurley et al. |
| 8,942,920 B1 | 1/2015 | Davidson et al. |
| 8,958,985 B1 | 2/2015 | Davidson |
| 9,273,975 B1 | 3/2016 | Davidson |
| 2003/0216865 A1* | 11/2003 | Riewe ................. G01S 19/47 701/470 |
| 2006/0047423 A1* | 3/2006 | Min ................. G01C 21/30 701/533 |
| 2010/0217524 A1 | 8/2010 | Oohashi et al. |
| 2010/0228477 A1 | 9/2010 | Sakashita |

(Continued)

OTHER PUBLICATIONS

United States Patent and Trademark Office, Office Action for U.S. Appl. No. 14/170,128, dated Jul. 17, 2015, 18 pages.

(Continued)

*Primary Examiner* — Rami Khatib
*Assistant Examiner* — Gerrad A Foster
(74) *Attorney, Agent, or Firm* — Alston & Bird LLP

(57) ABSTRACT

Computer program products, methods, systems, apparatus, and computing entities are provided for determining the accuracy of map information/data. In one embodiment, map information/data and collected telematics information/data can be compared. The difference between the map information/data and the telematics information/data can be used to determine the accuracy of the map information/data.

21 Claims, 38 Drawing Sheets

(56) References Cited

U.S. PATENT DOCUMENTS

| 2011/0118979 A1* | 5/2011 | Mao .................. G01C 21/005 |
| | | 701/532 |
| 2011/0172910 A1 | 7/2011 | Hurley et al. |
| 2011/0172911 A1 | 7/2011 | Hurley et al. |
| 2012/0253861 A1 | 10/2012 | Davidson et al. |
| 2013/0304349 A1 | 11/2013 | Davidson |
| 2016/0171012 A1 | 6/2016 | Davidson |

OTHER PUBLICATIONS

U.S. Appl. No. 14/046,172, "Methods, Apparatuses and Computer Program Products for Identifying Duplicate Travel", Unpublished, filed Oct. 4, 2014, Mark J. Davidson, Inventor; United Parcel Service.

United States Patent and Trademark Office, Office Action for U.S. Appl. No. 14/170,219, dated Aug. 1, 2014, 20 pages.

United States Patent and Trademark Office, Office Action for U.S. Appl. No. 14/170,128, dated Aug. 14, 2014, 16 pages.

United States Patent and Trademark Office, Office Action for U.S. Appl. No. 14/169,682, dated Aug. 1, 2014, 21 pages.

United States Patent and Trademark Office, Notice of Allowance for U.S. Appl. No. 14/169,682, dated Nov. 7, 2014, 8 pages, USA.

United States Patent and Trademark Office, Notice of Allowance for U.S. Appl. No. 14/170,219, dated Nov. 17, 2014, 8 pages, USA.

United States Patent and Trademark Office, Office Action for U.S. Appl. No. 14/170,128, dated Jan. 26, 2015, 15 pages, USA.

United States Patent and Trademark Office, Office Action for U.S. Appl. No. 14/570,136, dated Mar. 26, 2015, 10 pages, USA.

United States Patent and Trademark Office, Office Action for U.S. Appl. No. 14/570,136, Jul. 16, 2015, 9 pages, USA.

United States Patent and Trademark Office, Notice of Allowance for U.S. Appl. No. 14/570,136, dated Nov. 23, 2015, 9 pages, USA.

United States Patent and Trademark Office, Office Action for U.S. Appl. No. 15/002,573, dated Mar. 28, 2016, 7 pages, USA.

United States Patent and Trademark Office, Office Action for U.S. Appl. No. 14/170,128, dated Nov. 14, 2016, 14 pages, USA.

United States Patent and Trademark Office, Office Action for U.S. Appl. No. 14/170,128, dated Jul. 14, 2016, 8 pages, U.S.

United States Patent and Trademark Office, Office Action for U.S. Appl. No. 15/002,573, dated Aug. 11, 2016, 9 pages, U.S.

United States Patent and Trademark Office, Notice of Allowance for U.S. Appl. No. 15/002,573, dated Oct. 11, 2016, 8 pages, U.S.

Notice of Allowance and Fees Due (PTOL-85) dated Jun. 2, 2017 for U.S. Appl. No. 14/170,128.

* cited by examiner

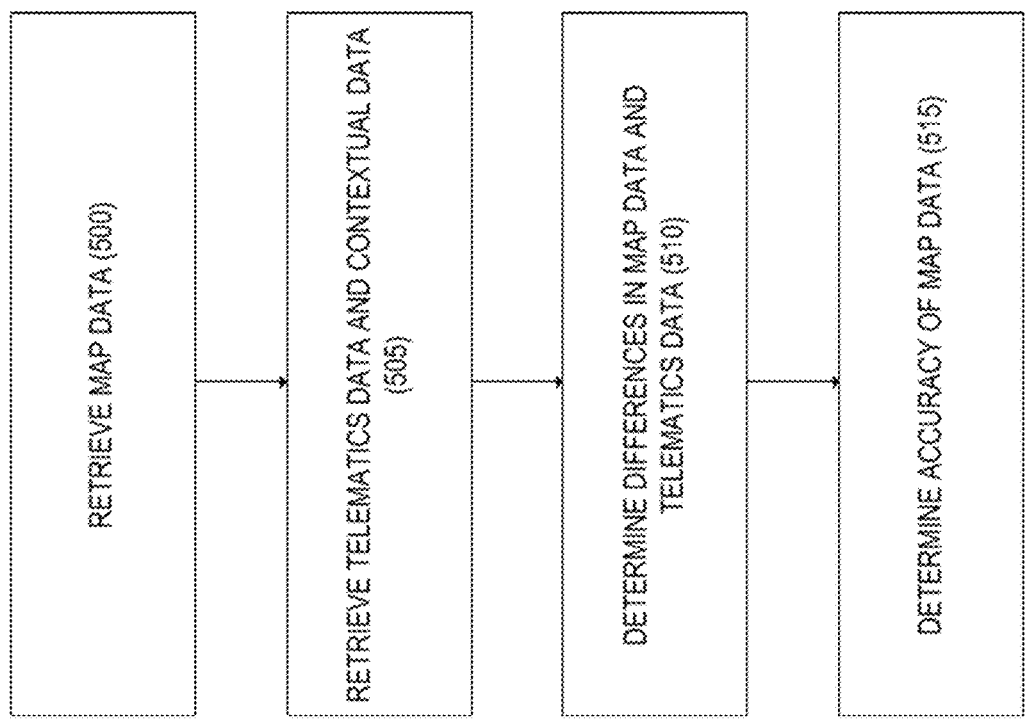

| Route Stop | Address | City | State |
|---|---|---|---|
| R1:1 | 1 STREET ADDRESS | ANYTOWN | GEORGIA |
| R1:2 | 2 STREET ADDRESS | ANYTOWN | GEORGIA |
| R1:3 | 3 STREET ADDRESS | ANYTOWN | GEORGIA |
| R1:4 | 4 STREET ADDRESS | ANYTOWN | GEORGIA |
| R1:5 | 5 STREET ADDRESS | ANYTOWN | GEORGIA |
| R1:6 | 6 STREET ADDRESS | ANYTOWN | GEORGIA |
| R2:1 | 7 STREET ADDRESS | ANYTOWN | GEORGIA |
| R2:2 | 8 STREET ADDRESS | ANYTOWN | GEORGIA |
| R2:3 | 9 STREET ADDRESS | ANYTOWN | GEORGIA |
| R2:4 | 10 STREET ADDRESS | ANYTOWN | GEORGIA |
| R2:5 | 11 STREET ADDRESS | ANYTOWN | GEORGIA |
| R2:6 | 12 STREET ADDRESS | ANYTOWN | GEORGIA |
| R3:1 | 13 STREET ADDRESS | ANYTOWN | GEORGIA |
| R3:2 | 14 STREET ADDRESS | ANYTOWN | GEORGIA |
| R3:3 | 15 STREET ADDRESS | ANYTOWN | GEORGIA |
| R3:4 | 16 STREET ADDRESS | ANYTOWN | GEORGIA |
| R3:5 | 17 STREET ADDRESS | ANYTOWN | GEORGIA |
| R3:6 | 18 STREET ADDRESS | ANYTOWN | GEORGIA |

Fig. 6A

| Route: Stop | Address | City | State | Map Distance |
|---|---|---|---|---|
| R1: 1 | 1 STREET ADDRESS | ANYTOWN | GEORGIA | - |
| R1: 2 | 2 STREET ADDRESS | ANYTOWN | GEORGIA | 1.850 |
| R1: 3 | 3 STREET ADDRESS | ANYTOWN | GEORGIA | 1.630 |
| R1: 4 | 4 STREET ADDRESS | ANYTOWN | GEORGIA | 0.280 |
| R1: 5 | 5 STREET ADDRESS | ANYTOWN | GEORGIA | 0.150 |
| R1: 6 | 6 STREET ADDRESS | ANYTOWN | GEORGIA | 0.210 |
| R2: 1 | 7 STREET ADDRESS | ANYTOWN | GEORGIA | 0.050 |
| R2: 2 | 8 STREET ADDRESS | ANYTOWN | GEORGIA | 0.020 |
| R2: 3 | 9 STREET ADDRESS | ANYTOWN | GEORGIA | 1.510 |
| R2: 4 | 10 STREET ADDRESS | ANYTOWN | GEORGIA | 1.460 |
| R2: 5 | 11 STREET ADDRESS | ANYTOWN | GEORGIA | 1.510 |
| R2: 6 | 12 STREET ADDRESS | ANYTOWN | GEORGIA | 0.010 |
| R3: 1 | 13 STREET ADDRESS | ANYTOWN | GEORGIA | 0.090 |
| R3: 2 | 14 STREET ADDRESS | ANYTOWN | GEORGIA | 1.170 |
| R3: 3 | 15 STREET ADDRESS | ANYTOWN | GEORGIA | 1.220 |
| R3: 4 | 16 STREET ADDRESS | ANYTOWN | GEORGIA | 0.910 |
| R3: 5 | 17 STREET ADDRESS | ANYTOWN | GEORGIA | 0 |
| R3: 6 | 18 STREET ADDRESS | ANYTOWN | GEORGIA | 0.020 |
| | | | Total Distance | 12.090 |

Fig. 6B

| Route: Stop | Address | City | State | Actual Distance |
|---|---|---|---|---|
| R1: 1 | 1 STREET ADDRESS | ANYTOWN | GEORGIA | 0.000 |
| R1: 2 | 2 STREET ADDRESS | ANYTOWN | GEORGIA | 1.914 |
| R1: 3 | 3 STREET ADDRESS | ANYTOWN | GEORGIA | 1.806 |
| R1: 4 | 4 STREET ADDRESS | ANYTOWN | GEORGIA | 0.455 |
| R1: 5 | 5 STREET ADDRESS | ANYTOWN | GEORGIA | 0.354 |
| R1: 6 | 6 STREET ADDRESS | ANYTOWN | GEORGIA | 0.310 |
| R2: 1 | 7 STREET ADDRESS | ANYTOWN | GEORGIA | 0.068 |
| R2: 2 | 8 STREET ADDRESS | ANYTOWN | GEORGIA | 0.065 |
| R2: 3 | 9 STREET ADDRESS | ANYTOWN | GEORGIA | 0.221 |
| R2: 4 | 10 STREET ADDRESS | ANYTOWN | GEORGIA | 0.391 |
| R2: 5 | 11 STREET ADDRESS | ANYTOWN | GEORGIA | 1.576 |
| R2: 6 | 12 STREET ADDRESS | ANYTOWN | GEORGIA | 0.091 |
| R3: 1 | 13 STREET ADDRESS | ANYTOWN | GEORGIA | 0.147 |
| R3: 2 | 14 STREET ADDRESS | ANYTOWN | GEORGIA | 0.234 |
| R3: 3 | 15 STREET ADDRESS | ANYTOWN | GEORGIA | 0.218 |
| R3: 4 | 16 STREET ADDRESS | ANYTOWN | GEORGIA | 0.920 |
| R3: 5 | 17 STREET ADDRESS | ANYTOWN | GEORGIA | 0.014 |
| R3: 6 | 18 STREET ADDRESS | ANYTOWN | GEORGIA | 0.029 |
|  |  |  |  | 8.813 |

Fig. 6C

| Stop | Time | Address | City | State | Actual Distance | Map Distance | Difference | Percent | Notes | Excess Driver Travel | Turn Around Travel |
|---|---|---|---|---|---|---|---|---|---|---|---|
| R1: 1 | 09:30:17 | 1 STREET ADDRESS | ANYTOWN | GEORGIA | 0.000 | - | - | - | - | - | - |
| R1: 2 | 09:37:46 | 2 STREET ADDRESS | ANYTOWN | GEORGIA | 1.914 | 1.850 | -0.064 | -3.336% | Parking Lot | - | - |
| R1: 3 | 09:57:46 | 3 STREET ADDRESS | ANYTOWN | GEORGIA | 1.806 | 1.630 | -0.176 | -9.766% | Parking Lot | - | - |
| R1: 4 | 10:01:09 | 4 STREET ADDRESS | ANYTOWN | GEORGIA | 0.455 | 0.280 | -0.175 | -38.409% | Parking Lot | 0.090 | - |
| R1: 5 | 10:03:58 | 5 STREET ADDRESS | ANYTOWN | GEORGIA | 0.354 | 0.150 | -0.204 | -57.589% | Parking Lot | - | - |
| R1: 6 | 10:06:59 | 6 STREET ADDRESS | ANYTOWN | GEORGIA | 0.310 | 0.210 | -0.100 | -32.293% | Parking Lot | - | - |
| | | | | | | | | | | | |
| R2: 1 | 11:30:49 | 7 STREET ADDRESS | ANYTOWN | GEORGIA | 0.068 | 0.050 | -0.018 | -26.557% | Parking Lot | - | - |
| R2: 2 | 11:33:37 | 8 STREET ADDRESS | ANYTOWN | GEORGIA | 0.055 | 0.030 | -0.045 | -59.021% | Parking Lot | - | - |
| R2: 3 | 11:35:32 | 9 STREET ADDRESS | ANYTOWN | GEORGIA | 0.221 | 1.510 | 1.289 | 583.382% | Parking Lot | - | - |
| R2: 4 | 11:38:20 | 10 STREET ADDRESS | ANYTOWN | GEORGIA | 0.391 | 1.460 | 1.069 | 273.134% | Parking Lot | - | - |
| R2: 5 | 11:44:10 | 11 STREET ADDRESS | ANYTOWN | GEORGIA | 1.576 | 1.510 | -0.066 | -4.198% | Parking Lot | - | - |
| R2: 6 | 11:50:40 | 12 STREET ADDRESS | ANYTOWN | GEORGIA | 0.091 | 0.010 | -0.081 | -88.973% | Parking Lot | - | - |
| | | | | | | | | | | | |
| R3: 1 | 13:02:18 | 13 STREET ADDRESS | ANYTOWN | GEORGIA | 0.147 | 0.090 | -0.057 | -38.721% | - | 0.060 | 0.060 |
| R3: 2 | 13:05:31 | 14 STREET ADDRESS | ANYTOWN | GEORGIA | 0.234 | 1.170 | 0.936 | 400.342% | Missing Street | - | - |
| R3: 3 | 13:07:24 | 15 STREET ADDRESS | ANYTOWN | GEORGIA | 0.218 | 1.220 | 1.002 | 459.967% | Missing Street | - | - |
| R3: 4 | 13:11:16 | 16 STREET ADDRESS | ANYTOWN | GEORGIA | 0.920 | 0.910 | -0.010 | -1.054% | - | - | - |
| R3: 5 | 13:13:53 | 17 STREET ADDRESS | ANYTOWN | GEORGIA | 0.014 | 0.000 | -0.014 | -100.000% | - | - | - |
| R3: 6 | 13:17:10 | 18 STREET ADDRESS | ANYTOWN | GEORGIA | 0.029 | 0.020 | -0.009 | -31.680% | - | - | - |
| | | | | | 8.813 | 12.090 | 3.277 | 37.191% | | 0.060 | 0.060 |

Fig. 24

| Stop | Time | Address | City | State | Map Distance < Actual Distance ||||
|---|---|---|---|---|---|---|---|---|
| | | | | | Actual Distance | Map Distance | Difference | Percentage |
| R1: 1 | 09:30:17 | 1 STREET ADDRESS | ANYTOWN | GEORGIA | - | - | - | - |
| R1: 2 | 09:37:48 | 2 STREET ADDRESS | ANYTOWN | GEORGIA | 1.914 | 1.850 | -0.064 | -3.336% |
| R1: 3 | 09:57:46 | 3 STREET ADDRESS | ANYTOWN | GEORGIA | 1.806 | 1.630 | -0.176 | -9.766% |
| R1: 4 | 10:01:09 | 4 STREET ADDRESS | ANYTOWN | GEORGIA | 0.455 | 0.280 | -0.175 | -38.409% |
| R1: 5 | 10:03:58 | 5 STREET ADDRESS | ANYTOWN | GEORGIA | 0.354 | 0.150 | -0.204 | -57.589% |
| R1: 6 | 10:06:59 | 6 STREET ADDRESS | ANYTOWN | GEORGIA | 0.310 | 0.210 | -0.100 | -32.293% |
| R2: 1 | 11:30:49 | 7 STREET ADDRESS | ANYTOWN | GEORGIA | 0.068 | 0.050 | -0.018 | -26.557% |
| R2: 2 | 11:33:37 | 8 STREET ADDRESS | ANYTOWN | GEORGIA | 0.065 | 0.020 | -0.045 | -69.021% |
| R2: 3 | 11:35:32 | 9 STREET ADDRESS | ANYTOWN | GEORGIA | - | - | - | - |
| R2: 4 | 11:38:20 | 10 STREET ADDRESS | ANYTOWN | GEORGIA | - | - | - | - |
| R2: 5 | 11:44:10 | 11 STREET ADDRESS | ANYTOWN | GEORGIA | 1.576 | 1.510 | -0.066 | -4.198% |
| R2: 6 | 11:50:42 | 12 STREET ADDRESS | ANYTOWN | GEORGIA | 0.091 | 0.010 | -0.081 | -88.973% |
| R3: 1 | 13:02:18 | 13 STREET ADDRESS | ANYTOWN | GEORGIA | 0.147 | 0.090 | -0.057 | -38.721% |
| R3: 2 | 13:05:31 | 14 STREET ADDRESS | ANYTOWN | GEORGIA | - | - | - | - |
| R3: 3 | 13:07:24 | 15 STREET ADDRESS | ANYTOWN | GEORGIA | - | - | - | - |
| R3: 4 | 13:11:16 | 16 STREET ADDRESS | ANYTOWN | GEORGIA | 0.920 | 0.910 | -0.010 | -1.054% |
| R3: 5 | 13:13:53 | 17 STREET ADDRESS | ANYTOWN | GEORGIA | 0.014 | 0.000 | -0.014 | -100.000% |
| R3: 6 | 13:17:12 | 18 STREET ADDRESS | ANYTOWN | GEORGIA | 0.029 | 0.020 | -0.009 | -31.880% |
| | | | | | 7.749 | 6.730 | -1.019 | -13.145% |

| Adjusted to Exclude the Excess Travel and Turn Around Travel |||
|---|---|---|
| 7.609 | 6.730 | -0.879 | -11.547% |

Fig. 25

| Stop | Time | Address | City | State | Map Distance > Actual Distance | | | |
|---|---|---|---|---|---|---|---|---|
| | | | | | Actual Distance | Map Distance | Difference | Percentage |
| R1: 1 | 09:30:17 | 1 STREET ADDRESS | ANYTOWN | GEORGIA | - | - | - | - |
| R1: 2 | 09:37:48 | 2 STREET ADDRESS | ANYTOWN | GEORGIA | - | - | - | - |
| R1: 3 | 09:57:46 | 3 STREET ADDRESS | ANYTOWN | GEORGIA | - | - | - | - |
| R1: 4 | 10:01:09 | 4 STREET ADDRESS | ANYTOWN | GEORGIA | - | - | - | - |
| R1: 5 | 10:03:58 | 5 STREET ADDRESS | ANYTOWN | GEORGIA | - | - | - | - |
| R1: 6 | 10:06:59 | 6 STREET ADDRESS | ANYTOWN | GEORGIA | - | - | - | - |
| R2: 1 | 11:30:49 | 7 STREET ADDRESS | ANYTOWN | GEORGIA | - | - | - | - |
| R2: 2 | 11:33:37 | 8 STREET ADDRESS | ANYTOWN | GEORGIA | - | - | - | - |
| R2: 3 | 11:35:32 | 9 STREET ADDRESS | ANYTOWN | GEORGIA | 0.221 | 1.510 | 1.289 | 583.382% |
| R2: 4 | 11:38:20 | 10 STREET ADDRESS | ANYTOWN | GEORGIA | 0.391 | 1.460 | 1.069 | 273.134% |
| R2: 5 | 11:44:10 | 11 STREET ADDRESS | ANYTOWN | GEORGIA | - | - | - | - |
| R2: 6 | 11:50:42 | 12 STREET ADDRESS | ANYTOWN | GEORGIA | - | - | - | - |
| R3: 1 | 13:02:18 | 13 STREET ADDRESS | ANYTOWN | GEORGIA | - | - | - | - |
| R3: 2 | 13:05:31 | 14 STREET ADDRESS | ANYTOWN | GEORGIA | 0.234 | 1.170 | 0.936 | 400.342% |
| R3: 3 | 13:07:24 | 15 STREET ADDRESS | ANYTOWN | GEORGIA | 0.218 | 1.220 | 1.002 | 459.967% |
| R3: 4 | 13:11:16 | 16 STREET ADDRESS | ANYTOWN | GEORGIA | - | - | - | - |
| R3: 5 | 13:13:53 | 17 STREET ADDRESS | ANYTOWN | GEORGIA | - | - | - | - |
| R3: 6 | 13:17:12 | 18 STREET ADDRESS | ANYTOWN | GEORGIA | - | - | - | - |
| | | | | | 1.064 | 5.360 | 4.296 | 403.783% |

Fig. 26

|  | Actual Distance | Map Distance | Difference | Percentage |
|---|---|---|---|---|
| Underage | 7.609 | 6.730 | -0.879 | -11.547% |
| Overage | 1.064 | 5.360 | 4.296 | 403.783% |

| Totals | 8.673 | 12.090 | 5.175 | 59.667% |
|---|---|---|---|---|
|  |  | ABS Val |  | Total Percentage Difference |

| Stop | Address | City | State | Telematics Data | Map Data (Snapped) | Difference |
|---|---|---|---|---|---|---|
| R1:1 | 1 STREET ADDRESS | ANYTOWN | GEORGIA | 33.7869125, -84.3875613 | 33.7871121, -84.3885602 | 0.059 |
| R1:2 | 2 STREET ADDRESS | ANYTOWN | GEORGIA | 33.7856888, -84.3875555 | 33.7814321, -84.3875222 | 0.293 |
| R1:3 | 3 STREET ADDRESS | ANYTOWN | GEORGIA | 33.7899999, -84.3875777 | 33.7801234, -84.3875444 | 0.681 |
| | | | | | | 1.033 Miles |

Fig. 29B

| Stop | Address | City | State | Telematics Data | Map Data (Interpolated) | Difference in Miles |
|---|---|---|---|---|---|---|
| R1:1 | 1 STREET ADDRESS | ANYTOWN | GEORGIA | 33.7869125, -84.3875613 | 33.7879128, -84.3885602 | 0.089 |
| R1:2 | 2 STREET ADDRESS | ANYTOWN | GEORGIA | 33.7856888, -84.3875555 | 33.7816111, -84.3875222 | 0.281 |
| R1:3 | 3 STREET ADDRESS | ANYTOWN | GEORGIA | 33.7899999, -84.3875777 | 33.7809333, -84.3875444 | 0.625 |
| | | | | | | 0.995 Miles |

| | Map Distance |
|---|---|
| DEPART FROM - 1 STREET ADDRESS, ANYTOWN, GA | - |
| 1 STREET ADDRESS, ANYTOWN, GA | 0.390 |
| 14TH ST. NE, ANYTOWN, GA | 0.720 |
| WILLIAMS ST. NW, ANYTOWN, GA | 0.490 |
| STREET ADDRESS, ANYTOWN, GA | 0.250 |
| ARRIVE AT - 2 STREET ADDRESS, ANYTOWN, GA | - |
| DEPART FROM - 2 STREET ADDRESS, ANYTOWN, GA | |
| 2 STREET ADDRESS, ANYTOWN, GA | 0.370 |
| I-75 N, ANYTOWN, GA | 0.650 |
| EXIT 256, ANYTOWN, GA | 0.400 |
| MT. PARAN ROAD, ANYTOWN, GA | 0.200 |
| STREET ADDRESS, ANYTOWN, GA | 0.010 |
| ARRIVE AT - 3 STREET ADDRESS, ANYTOWN, GA | - |

Fig. 30

| | Map Distance | Telematics Distance |
|---|---|---|
| DEPART FROM - 1 STREET ADDRESS, ANYTOWN, GA | | |
| 1 STREET ADDRESS, ANYTOWN, GA | 0.390 | 0.390 |
| 14TH ST. NE, ANYTOWN, GA | 0.720 | 0.720 |
| WILLIAMS ST. NW, ANYTOWN, GA | 0.490 | 0.554 |
| STREET ADDRESS, ANYTOWN, GA | 0.250 | 0.250 |
| ARRIVE AT - 2 STREET ADDRESS, ANYTOWN, GA | | |
| DEPART FROM - 2 STREET ADDRESS, ANYTOWN, GA | | |
| 2 STREET ADDRESS, ANYTOWN, GA | 0.370 | 0.370 |
| I-75 N, ANYTOWN, GA | 0.650 | 0.650 |
| EXIT 256, ANYTOWN, GA | 0.400 | 0.400 |
| MT. PARAN ROAD, ANYTOWN, GA | 0.200 | 0.366 |
| STREET ADDRESS, ANYTOWN, GA | 0.010 | 0.020 |
| ARRIVE AT - 3 STREET ADDRESS, ANYTOWN, GA | | |

Fig. 31

| | Map Distance | Telematics Distance | Difference | Percentage |
|---|---|---|---|---|
| DEPART FROM - 1 STREET ADDRESS, ANYTOWN, GA | - | - | - | - |
| 1 STREET ADDRESS, ANYTOWN, GA | 0.390 | 0.390 | 0.000 | 0.000% |
| 14TH ST. NE, ANYTOWN, GA | 0.720 | 0.720 | 0.000 | 0.000% |
| WILLIAMS ST. NW, ANYTOWN, GA | 0.490 | 0.554 | -0.064 | -13.061% |
| STREET ADDRESS, ANYTOWN, GA | 0.250 | 0.250 | 0.000 | 0.000% |
| ARRIVE AT - 2 STREET ADDRESS, ANYTOWN, GA | - | - | - | - |
| DEPART FROM - 2 STREET ADDRESS, ANYTOWN, GA | - | - | - | - |
| 2 STREET ADDRESS, ANYTOWN, GA | 0.370 | 0.370 | 0.000 | 0.000% |
| I-75 N. ANYTOWN, GA | 0.650 | 0.650 | 0.000 | 0.000% |
| EXIT 256, ANYTOWN, GA | 0.400 | 0.400 | 0.000 | 0.000% |
| MT. PARAN ROAD, ANYTOWN, GA | 0.200 | 0.366 | -0.166 | -83.000% |
| STREET ADDRESS, ANYTOWN, GA | 0.010 | 0.020 | -0.010 | -100.000% |
| ARRIVE AT - 3 STREET ADDRESS, ANYTOWN, GA | - | - | - | - |

Fig. 32

| WILLIAMS ST. NW, ANYTOWN, GA | |
|---|---|
| ID | 20370 |
| Prefix Direction | |
| Suffix Direction | NW |
| Name | Williams |
| Type | Street |
| Length in Feet | 2,587.20 |
| Length in Miles | 0.49 |
| Flag for Length Error | Yes |
| Error Length | -0.064 |
| Address Range | 200-299 |
| Left Side Address | 201-299 |
| Right Side Address | 200-298 |

Fig. 33

Accuracy Report

Report Type: Accuracy Report for Route 1

Report Filter: Differences > 10%

| Street Information | Segment ID | Map Distance | Telematics Distance | Difference | Percentage |
|---|---|---|---|---|---|
| WILLIAMS ST. NW, ANYTOWN, GA | 20370 | 0.490 | 0.554 | -0.064 | -13.061% |
| MT. PARAN ROAD, ANYTOWN, GA | 20881 | 0.200 | 0.366 | -0.166 | -83.000% |
| STREET ADDRESS, ANYTOWN, GA | 20879 | 0.010 | 0.020 | -0.010 | -100.000% |

Fig. 34

Accuracy Report

Report Type
Accuracy Report for Zip Code 99999

Report Filter
Differences > 0.1 Miles

| Street Information | Segment ID | Map Distance | Telematics Distance | Difference | Percentage |
|---|---|---|---|---|---|
| MT. PARAN ROAD, ANYTOWN, GA | 20881 | 0.200 | 0.366 | -0.166 | -83.000% |

Fig. 35

DETERMINING THE ACCURACY OF MAP DATA AND PROVIDING REPORTS FOR SAME

CROSS-REFERENCE TO RELATED APPLICATIONS

This application is a continuation-in-part of U.S. application Ser. No. 14/570,136 filed Dec. 15, 2014, which is a continuation of U.S. application Ser. No. 14/169,682 filed Jan. 31, 2014 and now issued as U.S. Pat. No. 8,942,920, which are hereby incorporated herein in their entireties by reference.

BACKGROUND

Map vendors, such as Tele Atlas® and NAVTEQ®, provide digital/electronic geographical maps to a variety of clients for different purposes. For example, map vendors may provide digital maps to (a) Internet websites for providing driving directions to consumers; (b) cellular companies to include in smartphones; (c) government agencies (e.g., the United States Department of Agriculture and Environmental Protection Agency) for use in their respective government functions; and (d) transportation and logistics companies, such as United Parcel Service of America, Inc. (UPS), for determining and optimizing delivery routes. Unfortunately, the digital maps provided by vendors are not always accurate. Thus, a need exists for determining the accuracy of digital maps and identifying the inaccuracies.

BRIEF SUMMARY

In general, embodiments of the present invention provide methods, apparatus, systems, computing devices, computing entities, and/or the like for determining the accuracy of map information/data.

In accordance with one aspect, a method for determining the accuracy of map information/data is provided. In one embodiment, the method comprises (1) determining an estimated distance for each of a plurality of segments for traveling from a first serviceable point to a second serviceable point, each estimated distance determined based at least in part on map data; (2) determining an actual distance for each of the plurality of segments traveled from the first serviceable point to the second serviceable point based at least in part on telematics data collected while a vehicle traveled from the first serviceable point to the second serviceable point; (3) determining the accuracy of the map data for each of the plurality of segments based at least in part on the difference between the estimated distance and the actual distance; (4) determining whether each of the plurality of segments satisfies a configurable inaccuracy threshold; and (5) for each of the plurality of the plurality of segments satisfying the configurable inaccuracy threshold, indicating that the configurable inaccuracy threshold is satisfied.

In accordance with another aspect, a computer program product for determining the accuracy of map information/data is provided. The computer program product may comprise at least one computer-readable storage medium having computer-readable program code portions stored therein, the computer-readable program code portions comprising executable portions configured to (1) determine an estimated distance for each of a plurality of segments for traveling from a first serviceable point to a second serviceable point, each estimated distance determined based at least in part on map data; (2) determine an actual distance for each of the plurality of segments traveled from the first serviceable point to the second serviceable point based at least in part on telematics data collected while a vehicle traveled from the first serviceable point to the second serviceable point; (3) determine the accuracy of the map data for each of the plurality of segments based at least in part on the difference between the estimated distance and the actual distance; (4) determine whether each of the plurality of segments satisfies a configurable inaccuracy threshold; and (5) for each of the plurality of the plurality of segments satisfying the configurable inaccuracy threshold, indicate that the configurable inaccuracy threshold is satisfied.

In accordance with yet another aspect, an apparatus comprising at least one processor and at least one memory including computer program code is provided. In one embodiment, the at least one memory and the computer program code may be configured to, with the processor, cause the apparatus to (1) determine an estimated distance for each of a plurality of segments for traveling from a first serviceable point to a second serviceable point, each estimated distance determined based at least in part on map data; (2) determine an actual distance for each of the plurality of segments traveled from the first serviceable point to the second serviceable point based at least in part on telematics data collected while a vehicle traveled from the first serviceable point to the second serviceable point; (3) determine the accuracy of the map data for each of the plurality of segments based at least in part on the difference between the estimated distance and the actual distance; (4) determine whether each of the plurality of segments satisfies a configurable inaccuracy threshold; and (5) for each of the plurality of the plurality of segments satisfying the configurable inaccuracy threshold, indicate that the configurable inaccuracy threshold is satisfied.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is a flowchart illustrating operations and processes that can be used in accordance with various embodiments of the present invention.

Figure 1:
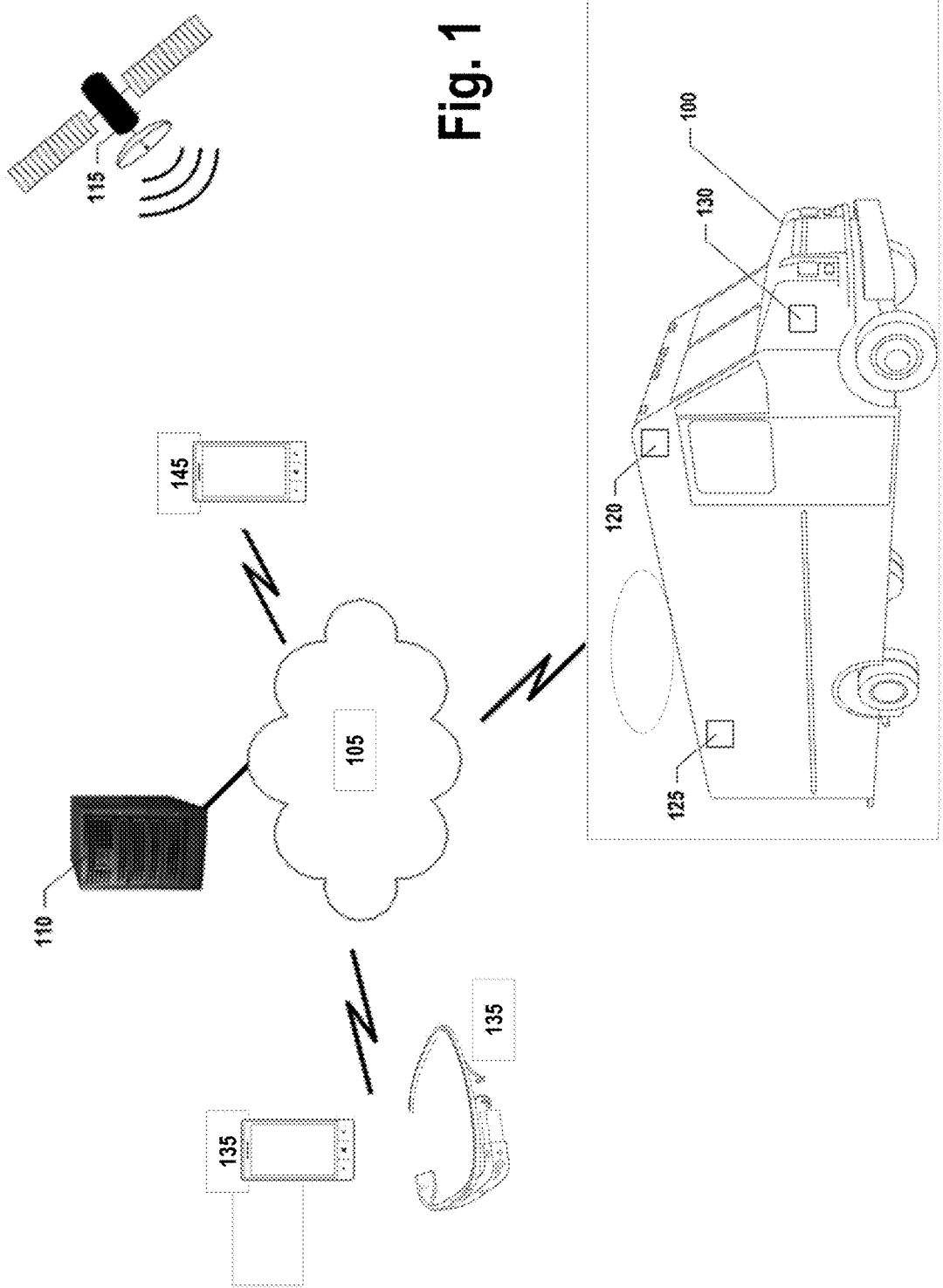
FIG. 1 is a diagram of a system that can be used to practice various embodiments of the present invention.

FIGS. 6A, 6B, 6C, 7-23A, 23B-28, 29A, 29B, and 30-35 illustrate exemplary input and output in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY ARCHITECTURE

The system may include one or more vehicles 100, one or more mapping computing entities 110, one or more Global Positioning System (GPS) satellites 115, one or more networks 105, one or more user computing entities 135, one or more mobile devices 145, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

a. Exemplary Vehicle

In various embodiments, the term vehicle 100 is used generically. For example, a vehicle 100 may be a tractor, a truck, a car, a motorcycle, a moped, a Segway, a bicycle, a golf cart, a hand truck, a cart, a trailer, a tractor and trailer combination, a van, a flatbed truck, a vehicle, and/or any other form of object for moving or transporting people and/or items (e.g., one or more packages, parcels, bags, containers, loads, crates, items banded together, vehicle parts, pallets, drums, the like, and/or similar words used herein interchangeably). Although in certain embodiments, the vehicle may be unmanned. In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to the vehicle 100.

Figure 2:
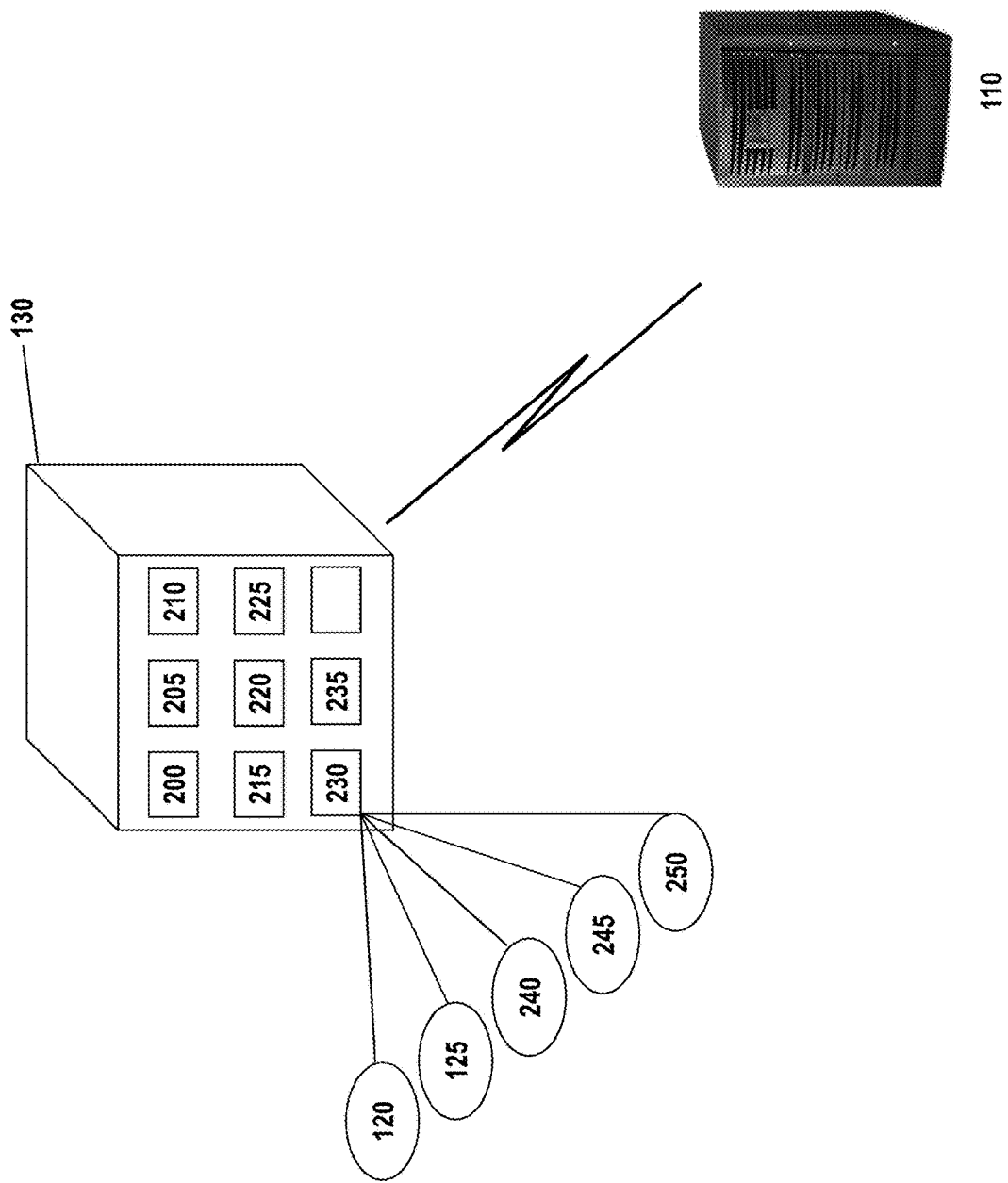
FIG. 2 is a diagram of an information/data collection device that may be used in association with certain embodiments of the present invention.

FIG. 1 shows one or more computing entities, devices, and/or similar words used herein interchangeably that are associated with the vehicle 100, such as an information/data collection device 130 or other computing entities. FIG. 2 provides a block diagram of an exemplary information/data collection device 130 that may be attached, affixed, disposed upon, integrated into, or part of a vehicle 100. The information/data collection device 130 may collect telematics information/data (including location data) and transmit/send the information/data to the mobile device 145, the mapping computing entity 110, and/or various other computing entities via one of several communication methods.

In one embodiment, the information/data collection device 130 may include, be associated with, or be in communication with one or more processors 200, one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending information/data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle 100 but external to the information/data collection device 130.

In one embodiment, the one or more location sensors 120 may be one of several components in communication with or available to the information/data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed information/data (e.g., referred to herein as telematics data). The one or more location sensors 120 may also communicate with the mapping computing entity 110, the information/data collection device 130, mobile device 145, and/or similar computing entities.

As indicated, in addition to the one or more location sensors 120, the information/data collection device 130 may include and/or be associated with one or more telematics sensors 125. For example, the telematics sensors 125 may include vehicle sensors, such as engine, fuel, odometer, hubometer, tire pressure, location, weight, emissions, door, and speed sensors. The telematics information/data may include, but is not limited to, speed information/data, emissions information/data, RPM information/data, tire pressure information/data, oil pressure information/data, seat belt usage information/data, distance information/data, fuel information/data, idle information/data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), ozone ($O_3$), hydrogen sulfide ($H_2S$) and/or ammonium ($NH_4$) information/data, and/or meteorological information/data (e.g., referred to herein as telematics data).

In one embodiment, the ECM 245 may be one of several components in communication with and/or available to the information/data collection device 130. The ECM 245, which may be a scalable and subservient device to the information/data collection device 130, may have information/data processing capability to decode and store analog and digital inputs from vehicle systems and sensors. The ECM 245 may further have information/data processing capability to collect and present telematics information/data to the J-Bus (which may allow transmission to the information/data collection device 130), and output standard vehicle diagnostic codes when received from a vehicle's J-Bus-compatible on-board controllers 240 and/or sensors.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High- Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

b. Exemplary Mapping Computing Entity

Figure 3:
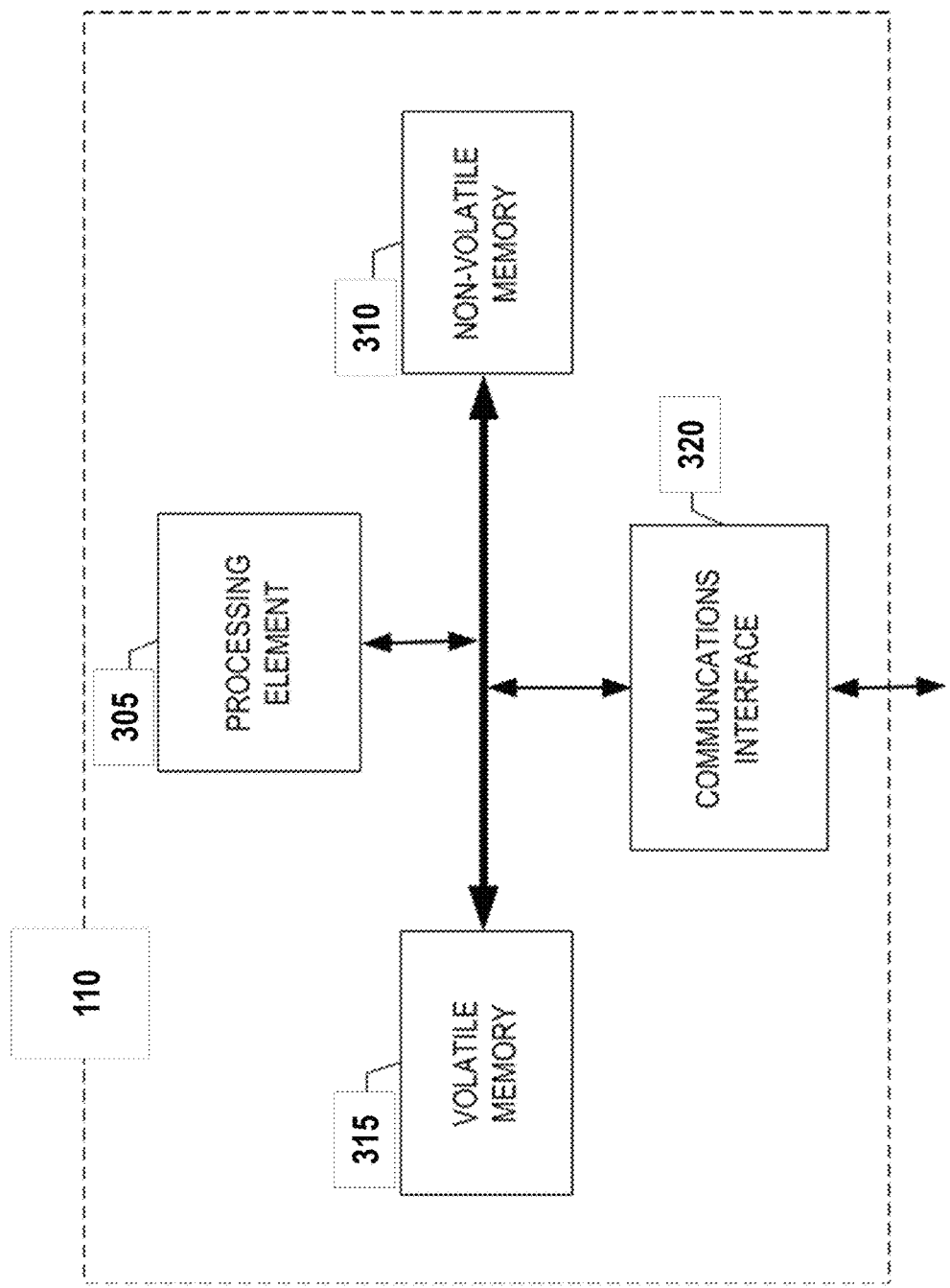
FIG. 3 is a schematic of a mapping computing entity in accordance with certain embodiments of the present invention.

FIG. 3 provides a schematic of a mapping computing entity 110 according to one embodiment of the present invention. In general, the terms computing entity, entity, device, system, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the mapping computing entity 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the mapping computing entity 110 may communicate with vehicles 100, mobile devices 145, and/or the like.

As shown in FIG. 3, in one embodiment, the mapping computing entity 110 may include or be in communication with one or more processing elements 305 (also referred to as processors, processing circuitry, and/or similar terms used herein interchangeably) that communicate with other elements within the mapping computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the mapping computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, information/data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the mapping computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, information/data, applications, programs, program modules, scripts, source code, object code, byte code, compiled code, interpreted code, machine code, executable instructions, and/or the like being executed by, for example, the processing element 305. Thus, the databases, database instances, database management system entities, information/data, applications, programs, program modules, scripts, source code, object code, byte code, compiled code, interpreted code, machine code, executable instructions, and/or the like may be used to control certain aspects of the operation of the mapping computing entity 110 with the assistance of the processing element 305 and operating system.

As indicated, in one embodiment, the mapping computing entity 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the mapping computing entity 110 may communicate with computing entities or communication interfaces of the vehicle 100, mobile devices 145, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the mapping computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the mapping computing entity 110 may include or be in communication with one or more input elements, such as a keyboard input, a mouse input, a touch screen/display input, audio input, pointing device input, joystick input, keypad input, and/or the like. The mapping computing entity 110 may also include or be in communication with one or more output elements (not shown), such as audio output, video output, screen/display output, motion output, movement output, and/or the like.

As will be appreciated, one or more of the mapping computing entity's 110 components may be located remotely from other mapping computing entity 110 components, such as in a distributed system. Furthermore, one or more of the components may be combined and additional components performing functions described herein may be included in the mapping computing entity 110. Thus, the mapping computing entity 110 can be adapted to accommodate a variety of needs and circumstances.

c. Exemplary Mobile Device

Figure 4:
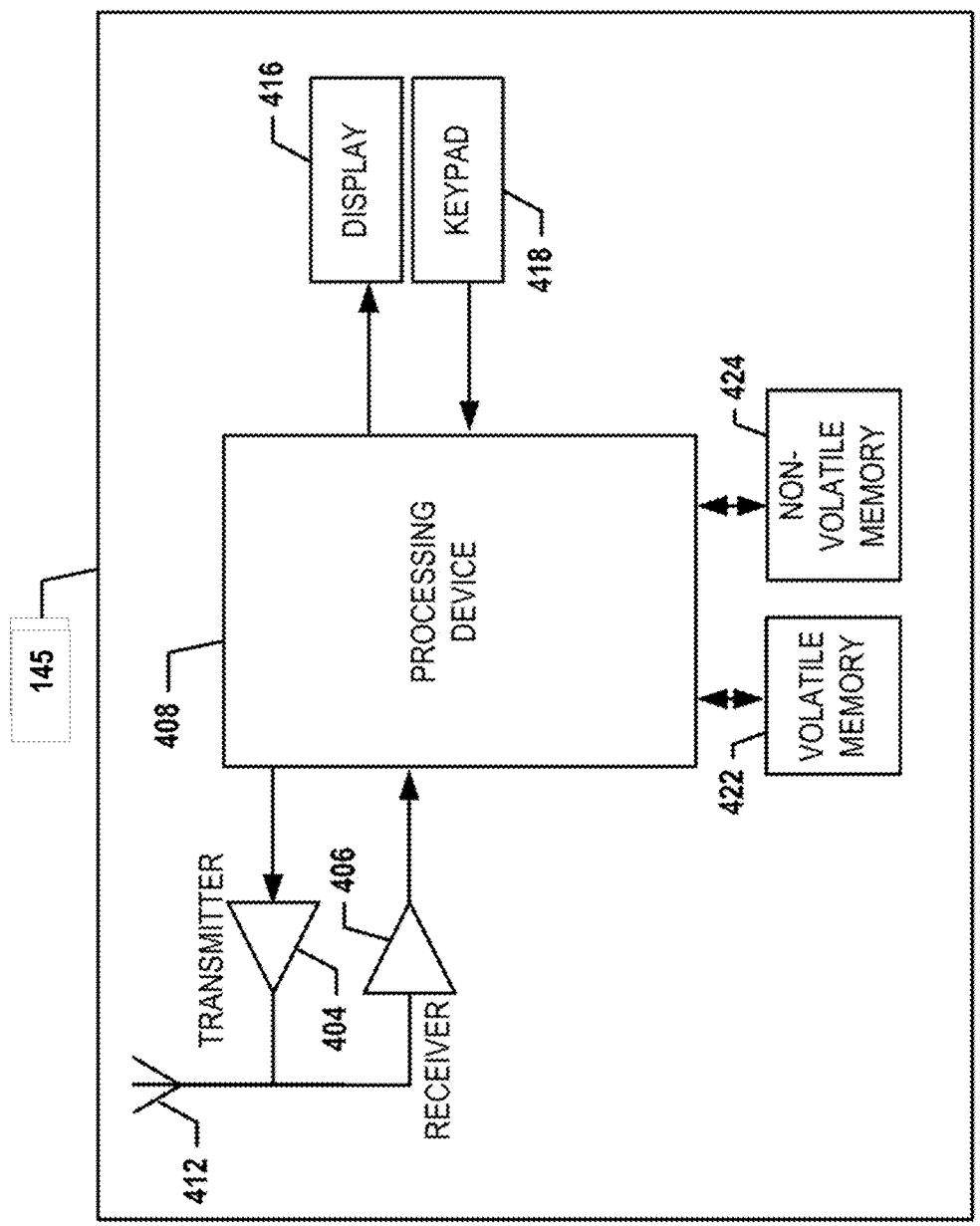
FIG. 4 is a schematic of a mobile device in accordance with certain embodiments of the present invention.

FIG. 4 provides an illustrative schematic representative of a mobile device 145 that can be used in conjunction with embodiments of the present invention. Mobile devices 145 can be operated by various parties, including operators of vehicles 100. As shown in FIG. 4, a mobile device 145 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 100, mapping computing entity 110, and/or the like. In this regard, the mobile device 145 may be capable of operating with one or more air interface standards, communication protocols, modulation types, and access types. More particularly, the mobile device 145 may operate in accordance with any of a number of wireless communication standards and protocols. In a particular embodiment, the mobile device 145 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 145 can communicate with various other entities using concepts such as Unstructured Supplementary Telematics information/data (USSD), Short Message Service (SMS), Multimedia Messaging Service (MMS), Dual-Tone Multi-Frequency Signaling (DTMF), and/or Subscriber Identity Module Dialer (SIM dialer). The mobile device 145 can also download changes, add-ons, and updates, for instance, to its firmware, software (e.g., including executable instructions, applications, program modules), and operating system.

According to one embodiment, the mobile device 145 may include location determining aspects, devices, modules, functionalities, and/or similar words used herein interchangeably. For example, the mobile device 145 may include outdoor positioning aspects, such as a location module adapted to acquire, for example, latitude, longitude, altitude, geocode, course, direction, heading, speed, UTC, date, and/or various other information/data. In one embodiment, the location module can acquire information/data, sometimes known as ephemeris information/data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the mobile device's 145 position in connection with a variety of other systems, including cellular towers, Wi-Fi access points, and/or the like. Similarly, the mobile device 145 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The mobile device 145 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile device 145 to interact with and/or cause display of information. The user input interface can comprise any of a number of devices allowing the mobile device 145 to receive information/data, such as a keypad 418 (hard or soft), a touch display, voice or motion interfaces, scanners, readers, or other input device. In embodiments including a keypad 418, the keypad 418 can include (or cause display of) the conventional numeric (0-9) and related keys (#, *), and other keys used for operating the mobile device 145 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile device can collect contextual information/data as part of the telematics information/data.

The mobile device 145 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the mobile device 145.

d. Exemplary User Computing Entity

The user computing entities 135 may each include one or more components that are functionally similar to those of the mapping computing entity 110 and/or the mobile device 145. For example, in one embodiment, each of the user computing entities may include: (1) a processing element that communicates with other elements via a system interface or bus; (2) a user interface; (3) transitory and non-transitory memory; and (4) a communications interface. As previously noted, the user computing entity 135 may comprise a user interface. For example, the user interface may be an application, browser, user interface, dashboard, webpage, and/or similar words used herein interchangeably executing on and/or accessible via the user computing entity 135 to interact with and/or cause display of information/data from the mapping computing entity 110 and/or the mobile device 145, as described herein. These architectures are provided for exemplary purposes only and are not limiting to the various embodiments.

III. EXEMPLARY OPERATION

Reference will now be made to 5, 6A, 6B, 6C, 7-23A, 23B-28, 29A, 29B, and 30-35. FIG. 5 is a flowchart illustrating operations and processes that can be used in accordance with various embodiments of the present invention. FIGS. 6A, 6B, 6C, 7-23A, 23B-28, 29A, 29B, and 30-35 illustrate exemplary input and output in accordance with various embodiments of the present invention.

a. Digital Maps

In one embodiment, a "serviceable point" may be any identifiable location, such as one or more addresses, delivery locations, parking locations, sidewalks, highways, trails, alleys, paths, walkways, streets, street segments, entrance or exit ramps, roads, longitude and latitude points, geocodes, zip codes, area codes, cities, counties, states, provinces, countries, stops (e.g., pick up stops, delivery stops, vehicle visits, stops) geofenced areas, geographic areas, landmarks, buildings, bridges, and/or other identifiable locations. For example, a serviceable point may be a residential location, such as one or more homes, one or more mobile homes, one or more apartments, one or more apartment buildings, one or more condominiums, one or more townhomes, one or more points at such locations, and/or the like. The serviceable point may also be any specific location at a residential location, e.g., (e.g., front door of a residence, side door of a residence, and/or the like). A serviceable point may also be a commercial location, such as one or more stores in a mall, one or more office buildings, one or more office parks, one or more offices of an apartment complex, one or more garages, one or more warehouses, one or more restaurants, one or more stores, one or more retail locations, one or more points at such locations, and/or the like. The serviceable point may also be any specific location at a commercial location, e.g., (e.g., front door of a commercial, dock of a commercial location, and/or the like). A serviceable point may be one or more streets, one or more street segments, one or more zones, one or more areas, one or more latitude and/or longitude points (e.g., 33.7869128, −84.3875602), one or more geocodes, and/or the like. A serviceable point may be any identifiable location. As will be recognized, a variety of approaches and techniques can be used to adapt to various needs and circumstances.

In certain embodiments, serviceable points can be represented digitally in geographical maps as map information/data. Map information/data may include boundary, location, and attribute information/data corresponding to the various serviceable points and/or the like. As will be recognized, the map information/data can be stored using a variety of formats, layers, and/or the like—including shapefiles, Arc-Maps, geodatabases, coverages, imagery, rasters, computer-aided drafting (CAD) files, other storage formats, and/or the like. For instance, the mapping computing entity 110 can appropriately store/record map information/data as a part of a digital map, e.g., as part of a feature layer, raster layer, service layer, geoprocessing layer, basemap layer, and/or the like.

Table 1 below and FIG. 6A show exemplary serviceable points in Anytown, Ga., which can be represented as map information/data in a digital map—see also FIGS. 7-23A and 23B and 28. In one embodiment, the map information/data may use an address, a longitude and latitude, a geocode, a nearest street network or street segment, and/or the like to identify the corresponding serviceable point.

TABLE 1

| Route: Stop | Address | City | State |
| --- | --- | --- | --- |
| R1: 1 | 1 STREET ADDRESS | ANYTOWN | GEORGIA |
| R1: 2 | 2 STREET ADDRESS | ANYTOWN | GEORGIA |
| R1: 3 | 3 STREET ADDRESS | ANYTOWN | GEORGIA |
| R1: 4 | 4 STREET ADDRESS | ANYTOWN | GEORGIA |
| R1: 5 | 5 STREET ADDRESS | ANYTOWN | GEORGIA |
| R1: 6 | 6 STREET ADDRESS | ANYTOWN | GEORGIA |
| R2: 1 | 7 STREET ADDRESS | ANYTOWN | GEORGIA |
| R2: 2 | 8 STREET ADDRESS | ANYTOWN | GEORGIA |
| R2: 3 | 9 STREET ADDRESS | ANYTOWN | GEORGIA |
| R2: 4 | 10 STREET ADDRESS | ANYTOWN | GEORGIA |
| R2: 5 | 11 STREET ADDRESS | ANYTOWN | GEORGIA |
| R2: 6 | 12 STREET ADDRESS | ANYTOWN | GEORGIA |
| R3: 1 | 13 STREET ADDRESS | ANYTOWN | GEORGIA |
| R3: 2 | 14 STREET ADDRESS | ANYTOWN | GEORGIA |
| R3: 3 | 15 STREET ADDRESS | ANYTOWN | GEORGIA |
| R3: 4 | 16 STREET ADDRESS | ANYTOWN | GEORGIA |
| R3: 5 | 17 STREET ADDRESS | ANYTOWN | GEORGIA |
| R3: 6 | 18 STREET ADDRESS | ANYTOWN | GEORGIA |

As will be recognized, serviceable points need not be addresses. For instance, a serviceable point can be a longitude and latitude or geocode (e.g., the recorded location of a vehicle stop). Further, serviceable points can be represented in digital maps as being accessible by one or more street networks or street segments of a street network. A "street network" is collection of street segments that comprise navigable/traversable/travelable roads, streets, highways, paths, trails, walkways, entrance and exit ramps, bridges, sidewalks, alleys, and/or the like that can be used to access serviceable points. Similar serviceable points, street networks can be represented in digital maps as navigable/traversable/travelable segments or points for traveling to and/or from serviceable points. FIGS. 7-23A and 23B show street networks for traveling to and from the various stops.

As will be recognized, digital maps (e.g., map data) may include various types of information/data about serviceable points and street networks, such as the longitude of street segments and/or serviceable points, the latitude of street segments and/or serviceable points, the altitude of street segments and/or serviceable points, the speed limits of street segments, direction restrictions for street segments, time penalties for street segments, and/or other information/data associated with street networks and serviceable points, and/or the like. For example, in one embodiment, a serviceable point may be represented by and/or associated with a longitude and latitude, a geocode, a nearest street segment, an address, and/or the like. Similarly, street segments of street networks may be represented by or associated with a street name, a segment identifier, a connecting node, an address or address range, a series of longitude and latitude coordinates, and/or the like that define the overall shape and location of the street segment. As will be recognized, a variety of other approaches and techniques can be used to adapt to various needs and circumstances.

In one embodiment, the mapping computing entity 110 may store digital maps. In another embodiment, the mapping computing may be in communication with or associated with one or more mapping websites/servers/providers/databases (including providers such as maps.google.com, bing.com/maps/, mapquest.com, Tele Atlas®, NAVTEQ®, and/or the like) that provide map information/data of digital maps to a variety of users and entities. Using the digital maps, an appropriate computing entity can provide map information/data, for example, about serviceable points (e.g., their locations, attributes, and/or the like) and/or their corresponding street networks based on map information/data. An appropriate computing entity can also provide map information/data, for example, about traveling to different serviceable points on the street networks. For instance, the map information/data may include a route for delivering one or more items to different serviceable points, the most efficient order for delivering items to the serviceable points, directions for traveling to and/or from the serviceable points, the estimated distance for traveling to and/or from the serviceable points, the expected time for traveling to and/or from the serviceable points, and/or the like. The term "route" is used generically to refer to any path traversed by a vehicle 100, person, and/or the like. The map information/data may also include other information/data about serviceable points and/or traveling to and from serviceable points, such as current estimated speeds for associated street segments, historical speeds for associated street segments, nearest street segments, posted speed limits for associated street segments, interpolated locations of serviceable points, reverse geocoded locations of serviceable points, latitude and longitude points of serviceable points, distances between various serviceable points, directions, stop orders, and/or the like. Certain examples of these types of information/data are described in U.S. Ser. No. 13/940,824, which is hereby incorporated in its entirety by reference.

In one embodiment, the mapping computing entity 110 can identify and/or retrieve map information/data associated with serviceable points and/or geographic areas. A geographic area may be one or more delivery routes, routes, delivery locations, parking locations, sidewalks, highways, trails, alleys, paths, walkways, streets, street segments, entrance or exit ramps, roads, zip codes, area codes, cities, counties, states, provinces, countries, and/or other identifiable location. For example, Table 2 below and FIG. 6B comprise information/data (including map data) for a geographic area comprising Route 1, Stops 1-6; Route 2, Stops 1-6; and Route 3, Stops 1-6. In this example, the information/data includes a route number, a stop number, a street address, a city, a state, and an estimated distance between each serviceable point (e.g., based on map data). Although not shown, other information/data can be provided as well.

TABLE 2

| Route: Stop | Address | City | State | Map Distance |
|---|---|---|---|---|
| R1: 1 | 1 STREET ADDRESS | ANYTOWN | GEORGIA | — |
| R1: 2 | 2 STREET ADDRESS | ANYTOWN | GEORGIA | 1.850 |
| R1: 3 | 3 STREET ADDRESS | ANYTOWN | GEORGIA | 1.630 |
| R1: 4 | 4 STREET ADDRESS | ANYTOWN | GEORGIA | 0.280 |
| R1: 5 | 5 STREET ADDRESS | ANYTOWN | GEORGIA | 0.150 |
| R1: 6 | 6 STREET ADDRESS | ANYTOWN | GEORGIA | 0.210 |
| R2: 1 | 7 STREET ADDRESS | ANYTOWN | GEORGIA | 0.050 |
| R2: 2 | 8 STREET ADDRESS | ANYTOWN | GEORGIA | 0.020 |
| R2: 3 | 9 STREET ADDRESS | ANYTOWN | GEORGIA | 1.510 |
| R2: 4 | 10 STREET ADDRESS | ANYTOWN | GEORGIA | 1.460 |
| R2: 5 | 11 STREET ADDRESS | ANYTOWN | GEORGIA | 1.510 |
| R2: 6 | 12 STREET ADDRESS | ANYTOWN | GEORGIA | 0.010 |
| R3: 1 | 13 STREET ADDRESS | ANYTOWN | GEORGIA | 0.090 |
| R3: 2 | 14 STREET ADDRESS | ANYTOWN | GEORGIA | 1.170 |
| R3: 3 | 15 STREET ADDRESS | ANYTOWN | GEORGIA | 1.220 |
| R3: 4 | 16 STREET ADDRESS | ANYTOWN | GEORGIA | 0.910 |
| R3: 5 | 17 STREET ADDRESS | ANYTOWN | GEORGIA | 0 |
| R3: 6 | 18 STREET ADDRESS | ANYTOWN | GEORGIA | 0.020 |
| | Total Distance | | | 12.090 |

In one embodiment, although not necessary, the map information/data can be provided to the driver of the vehicle 100 in a variety of ways and using various formats. For instance, the mobile device 145 may provide turn-by-turn navigation or directions to the driver for traveling to each stop on a route. For instance, as shown below in Table 3 and in FIG. 30, the navigation and directions (including distances) can comprise one or more stops and/or one or more route segments for traveling to and from each of the stops on the route. The below route segments identify how to travel from 1 Street Address, Anytown, Ga. to 2 Street Address, Anytown, Ga. of route 1 and from 2 Street Address, Anytown, Ga. to 3 Street Address, Anytown, Ga. of route 1.

TABLE 3

| | Map Distance |
|---|---|
| DEPART FROM - 1 STREET ADDRESS, ANYTOWN, GA | — |
| 1 STREET ADDRESS, ANYTOWN, GA | 0.390 |
| 14TH ST. NE, ANYTOWN, GA | 0.720 |
| WILLIAMS ST. NW, ANYTOWN, GA | 0.490 |
| STREET ADDRESS, ANYTOWN, GA | 0.250 |
| ARRIVE AT - 2 STREET ADDRESS, ANYTOWN, GA | — |
| DEPART FROM - 2 STREET ADDRESS, ANYTOWN, GA | — |
| 2 STREET ADDRESS, ANYTOWN, GA | 0.370 |
| I-75 N, ANYTOWN, GA | 0.650 |
| EXIT 256, ANYTOWN, GA | 0.400 |
| MT. PARAN ROAD, ANYTOWN, GA | 0.200 |
| STREET ADDRESS, ANYTOWN, GA | 0.010 |
| ARRIVE AT - 3 STREET ADDRESS, ANYTOWN, GA | — |

In another embodiment, the map information/data may be provided to a user of a user computing entity 135 in evaluating the accuracy of the map information/data and/or reviewing a driver's performance. As will be recognized, a variety of other techniques and approaches can be used to adapt to various needs and circumstances.

In one embodiment, the mapping computing entity 110 can identify and/or retrieve other map information/data associated with serviceable points and/or geographic areas. In one example, the mapping computing entity 110 can identify, retrieve, or determine the interpolated or reverse geocoded locations on the street networks for one or more of the serviceable points shown in Table 2, for instance. Or, in another example, the mapping computing entity 110 can identify, retrieve, and/or reverse geocode the latitude and longitude points of the serviceable points if available, such as the location of 1 Street Address, Anytown, Ga. being located at 33.7869128, −84.3875602. As will be recognized, a variety of other techniques and approaches can be used to adapt to various needs and circumstances.

b. Telematics Information/Data

In one embodiment, telematics information/data associated with serviceable points, street networks, street segments, and/or the like can be collected to determine, evaluate, identify, or similar words used herein interchangeably the accuracy of digital maps (e.g., map data). To do so, appropriate computing entities (e.g., information/data collection devices 130, mobile devices 145, and/or other computing entities) can be configured to collect/capture and store telematics information/data as vehicles 100 travel, traverse or similar words used herein interchangeably street networks (or other areas) and/or as drivers operate the vehicles 100 and/or mobile devices 145. In one embodiment, the telematics information/data may comprise location information/data, such as longitude information/data, latitude information/data, altitude information/data, heading or direction information/data, geocode information/data, course information/data, position information/data, time information/data, as well as other types of information/data (including those previously described). This telematics information/data can be collected in a variety of ways to evaluate the accuracy of digital maps (e.g., map data).

In one embodiment, the appropriate computing entities can collect/capture telematics information/data regularly, periodically, continuously, and/or upon determining the occurrence of one or more predefined triggers/events. In another embodiment, the appropriate computing entities can capture telematics information/data in response to certain triggers or events. For example, the information/data collection device 130 can monitor information/data generated by the vehicle sensors (120, 125) for parameters that match predefined triggers/events. In one embodiment, the information/data collection device 130 can monitor some or all the following predefined events: (a) the vehicle 100 being turned on and beginning to idle (e.g., where vehicle sensors 120, 125 indicate the vehicle's engine is turned on and the vehicle speed is zero); (b) the vehicle 100 beginning to move and thereby ceasing to idle (e.g., where the vehicle sensors 120, 125 indicate the vehicle's engine is on and the vehicle's speed has increased from zero to a non-zero value); (c) the vehicle 100 slowing to a stop and beginning to idle (e.g., where the vehicle sensors 120, 125 indicate the vehicle's engine is on and the vehicle's speed has decreased from a non-zero value to zero); (d) the vehicle 100 being turned off and ceasing to idle (e.g., where the vehicle sensors 120, 125 indicate the vehicle's engine is turned off and the vehicle speed is zero); (e) the vehicle 100 moving out of a geo-fenced area; (f) the vehicle 100 moving into a geo-fenced area; (g) the vehicle 100 moving into a geo-fenced area associated with a delivery area assigned to the vehicle 100 and/or its driver; (h) the vehicle 100 moving out of a geo-fenced area associated with a delivery area assigned to the vehicle 100 and/or its driver; (i) the vehicle 100 beginning to move in a reverse direction; (j) the vehicle 100 ceasing to move in a reverse direction; (k) the vehicle's 100 seat belt being engaged or disengaged while the vehicle's 100 engine is on; (l) the vehicle 100 beginning to move in a forward direction; (m) the vehicle 100 ceasing to move in a forward direction; (n) the vehicle 100 traveling above a certain speed; (o) the vehicle 100 being placed in the park position; and/or a variety of other triggers/events.

The information/data collection device 130 can determine whether any of such (or other) predefined triggers/events have occurred as the vehicle 100 traverses, travels, visits, or operates on street networks (or other areas) and/or as the driver operates the vehicle 100 and/or mobile device 145. If a predefined trigger/event is detected, the information/data collection device 130 can capture and store telematics information/data from the vehicle sensors 120, 125. As noted earlier, the telematics information/data captured from the sensors 120, 125 may include various types of telematics information/data, including location information/data.

If a predefined trigger/event is not detected, the information/data collection device 130 can determine whether a threshold information/data capture time has elapsed. For example, in one embodiment, the threshold information/data capture time can be defined as 30 seconds (or any other time period). If the information/data collection device 130 determines that the threshold information/data capture time has not elapsed, the information/data collection device 130 can continue monitoring for predefined events. However, if the information/data collection device 130 determines that the threshold information/data capture time has elapsed (e.g., more than 30 seconds have passed since the last time that information/data was captured from the vehicle sensors), the information/data collection device 130 can capture telematics information/data.

In one embodiment, the telematics information/data may include contextual information/data collected/captured with the telematics information/data. In another embodiment, contextual information/data can be associated with the collected/captured telematics information/data. For instance, an appropriate computing entity (e.g., mobile device 145) can be configured to collect/capture some or all of the following contextual data: (a) the date (e.g., 12/30/2014) and time (e.g., 13:24) the telematics information/data is captured; (b) the driver associated with the mobile device 145 at the time the telematics information/data is captured (e.g., James P. Smith); (c) the vehicle associated with the driver at the time the telematics information/data is captured (e.g., a vehicle identification number such as AS445); (d) the type of telematics information/data captured (e.g., stop status, lunch break); (e) if applicable—a route number and/or stop number associated with the input telematics information/data (e.g., stop 3); (f) the serviceable point associated with the telematics information/data captured; (g) the address associated with the telematics information/data captured; (h) a logged reason for and location of the information/data capture (e.g., a code indicating the detected predefined trigger/event or indicating that the threshold information/data capture time interval elapsed); and/or the like. Further, in one embodiment, an appropriate computing entity (e.g., the information/data collection device 130, the mapping computing entity 110, the mobile device 145, and/or the like) can be configured to associate the captured telematics information/data with the contextual information/data by, for example, storing fields of telematics information/data captured from the vehicle sensors 120, 125 in the same record, or records, as concurrently captured contextual information/data, thereby associating the two types of information/data if necessary.

In one embodiment, the information/data collection device 130 can transmit the captured telematics information/data and/or associated contextual information/data to the mapping computing entity 110 or mobile device 145. This may be accomplished by using any of the transmission methods and systems described herein, as well as other methods, protocols, and systems known in the art. In one embodiment the information/data collection device 130 can be configured to first attempt to transmit captured information/data to the mapping computing entity 110, and subsequently attempt to transfer information/data to the mobile device 145 if a connection with the mapping computing entity 110 is unavailable.

According to various embodiments, the mobile device 145 can also be configured to capture telematics information/data. More specifically, the mobile device 145 can collect/capture telematics information/data regularly, periodically, continuously, and/or upon determining the occurrence of one or more predefined triggers/events. For instance, the mobile device 145 can monitor its user interface or other inputs for user input (e.g., from a driver). In one embodiment, the mobile device 145 can be configured to receive and recognize user input indicating some or all of the following: (a) that a delivery stop has commenced; (b) that a delivery stop has ended; (c) that a particular delivery stop is a pickup, delivery, or both; (d) that a particular bill of lading and its associated freight or packages have been picked up or delivered; (e) the number of units picked up or delivered at a stop; (f) the weight of packages or freight picked up or delivered at a stop; (g) that a lunch or break period has commenced; (h) that a lunch or break period has ended; (i) that a particular delay has been encountered; (j) that a particular delay has ended; (k) that a driver has begun a work day and is on the clock; (l) that a driver has ended a work day and is off the clock; (m) that the vehicle 100 has moved out of a geo-fenced area (e.g., as indicated by a GPS sensor); (n) that the vehicle 100 has moved into a geo-fenced area; (o) that the vehicle 100 has moved into a geo-fenced area associated with a delivery area assigned to the vehicle 100 and/or its driver; (p) that the vehicle 100 has moved out of a geo-fenced area associated with a delivery area assigned to the vehicle 100 and/or its driver; (q) that a scan event of an item (e.g., scanning a barcode) has occurred; (r) that an electronic signature capture event has occurred; (s) that the vehicle 100 or driver is at a particular serviceable point; (t) that an item has been picked up from or delivered to a serviceable point; (u) that the vehicle 100 (or driver walking with the mobile device 145) has entered or exited a street network; (v) that the vehicle 100 has been placed in the park position; (w) that a configurable period of time has elapsed; (x) that a vehicle visit to a serviceable point has occurred; and/or the like.

The mobile device 145 can determine whether any of such (or other) predefined triggers/events have occurred. If a predefined trigger/event is detected, the mobile device 145 can collect/capture and store telematics information/data. As noted earlier, the telematics information/data may include various types of telematics information/data, including location information/data. If a predefined trigger/event is not detected, the mobile device 145 can determine whether a threshold information/data capture time has elapsed. For example, in one embodiment, the threshold information/data capture time is defined as 30 seconds (or any other predefined time period). If the mobile device 145 determines that the threshold information/data capture time has not elapsed, the mobile device 145 can continue monitoring for predefined events. However, if the mobile device 145 determines that the threshold information/data capture time has elapsed (e.g., more than 30 seconds have passed since the last time that information/data was captured from the vehicle sensors), the mobile device 145 can collect/capture telematics information/data.

In one embodiment, the telematics information/data may include contextual information/data. In another embodiment, the mobile device 145 can collect/capture contextual information/data and associate the contextual information/data with the collected/captured telematics information/data. For instance, the mobile device 145 can be configured to capture some or all of the following contextual data: (a) the date (e.g., 12/30/2014) and time (e.g., 13:24) the telematics information/data is captured; (b) the driver associated with the mobile device 145 at the time the telematics information/data is captured (e.g., James P. Smith); (c) the vehicle associated with the driver at the time the telematics information/data is captured (e.g., a vehicle identification number such as AS445); (d) the type of telematics information/data captured (e.g., delay code, stop status); (e) if applicable—a route number and/or stop number associated with the input telematics information/data (e.g., route1, stop 3); (f) the serviceable point associated with the telematics data; (g) the address associated with the telematics data; and/or the like. Further, the mobile device 145 (or other appropriate computing entity) can be configured to associate the collected/captured telematics information/data with the collected/captured contextual information/data in order to ensure that concurrently captured telematics information/data and contextual information/data are linked. For example, in one embodiment, the mobile device 145 can be configured to store one or more fields of telematics information/data in the same record, or records, as concurrently captured contextual information/data, thereby associating the two types of information/data if necessary.

In one embodiment, the mobile device 145 can determine or detect whether telematics information/data has been received (e.g., from the information/data collection device 130). If the mobile device detects that telematics information/data has been received, it stores the received telematics information/data. The mobile device 145 transmits the telematics information/data and/or associated contextual information/data to the mapping computing entity 110. This may be accomplished by using any of the transmission methods and systems described herein, as well as other methods, protocols, and systems known in the art. In one embodiment the information/data the mobile device 145 can be configured to first attempt to transmit captured information/data to the mapping computing entity 110, and subsequently attempt to transfer information/data to the information/data collection device 130 if a connection with the mapping computing entity 110 is unavailable. As will be recognized, a variety of other approaches and techniques can be used to adapt to various needs and circumstances.

c. Map Accuracy

According to various embodiments, the mapping computing entity 110 (and/or a variety of other computing entities) can receive, process, and store telematics information/data received from the information/data collection device 130, mobile device 145, and/or various other computing entities. In a particular embodiment, the mapping computing entity 110 can process and store information/data in a manner that facilitates evaluation of the telematics information/data (and contextual data) in conjunction with corresponding map information/data. This may include determining, identifying, evaluating, and similar words used herein interchangeably the accuracy of map information/data corresponding to serviceable points and/or geographic areas. As will be recognized, the below can be performed in a manual, semi-automatic, or automatic manner.

i. Example One: Routes in Geographic Areas

In one embodiment, the mapping computing entity 110 can determine the map accuracy associated with a geographic area based on traveled routes (e.g., in a manual, semi-automatic, and/or automatic manner). The process may begin when the mapping computing entity 110 receives a request that may originate from a variety of computing entities (e.g., from a user computing entity 135) to determine the map accuracy for one or more geographic areas. For example, the mapping computing entity 110 may receive a request to determine the map accuracy for zip code 30092; route 1; route 2; route 3; segments of each route; segments between in each stop in a route; Anytown, Ga.; and/or the like. In another embodiment, the mapping computing entity 110 can receive a request to determine the map accuracy for an area designated via input from a user computing entity 135 by, for example, the user drawing a polygon around the geographic area using an input mechanism, selecting displayed portions of the map, defining a geofence, and/or the like. As will be recognized, a variety of approaches and techniques can be used to adapt to various needs and circumstances. Responsive to such requests, the mapping computing entity 110 can identify routes, segments, portions of routes (paths traversed by a vehicle 100, person, and/or the like) that have been traversed for the geographic area and for which telematics information/data has been collected. Continuing with the above example, responsive to a request for determining the accuracy of Anytown, Ga., the mapping computing entity 110 may determine that all or portions of Route 1, Route 2, and Route 3 are within the specified geographic area, have been traversed, and have had corresponding telematics information/data collected. As will be recognized, a variety of different approaches and techniques can be used to adapt to various needs and circumstances.

In another embodiment, the mapping computing entity 110 may receive a request to determine the map accuracy of single route: Route 1, Route 2, or Route 3. This may include determining the accuracy of each the route, the segments of each route, and/or the segments between each stop on the route. In another example, the mapping computing entity 110 may receive a request to determine the map accuracy of multiple routes: Route 1, Route 2, or Route 3. In yet another example, the mapping computing entity 110 may receive a request to determine the map accuracy of a route between serviceable points. The serviceable points may be identified by name, address, a latitude and longitude point, and/or the like. For instance, the request may indicate the starting point for a route as 1 Street Address, Anytown, Ga., with an ending point as 6 Street Address, Anytown, Ga. Or, the request may indicate the starting point as 33.7869128, −84.3875602 with an ending point as 32.8679228, −83.1123209. In these examples, the mapping computing entity 110 may receive a request originating from a user computing entity 135 through which a user entered the corresponding route numbers, drivers, addresses, geocodes, longitudes and latitudes, and/or the like.

The requests may include temporal restrictions, such as requesting the map accuracy determination to be limited to telematics information/data associated with a given hour, day, month, year, and/or the like. As will be recognized, a variety of other approaches and techniques can be used to adapt to various needs and circumstance.

In one embodiment, the map accuracy of a geographic area, a route, or segments of a route traveled by a vehicle 100 can be determined by the mapping computing entity 110 as the difference in the route or segments of the route as indicated by the map information/data and the telematics information/data. In another embodiment, the map accuracy of a geographic area or multiple routes can be determined by the mapping computing entity 110 as the aggregate difference in the routes as indicated by the map information/data and the telematics information/data. As will be recognized, a variety of other approaches and techniques can be used to adapt to various needs and circumstances.

To process or evaluate the accuracy of map information/data, the mapping computing entity 110 can populate an information/data set with relevant telematics information/data, contextual information/data, and/or map information/data (Blocks 500, 505 of FIG. 5) corresponding to the specified geographic areas or routes. The information/data set may include telematics information/data, contextual information/data, and/or map information/data for the appropriate geographic areas or routes. Moreover, the information/data set may include map information/data, telematics information/data, and/or contextual information/data for the appropriate geographic areas or routes for a specified period of time. As indicated, the specified period of time may be a time period between stops, a time period between triggers/events, a work day, and/or another specified time period—such as an hour, a day, a week, a month, and/or the like. Continuing with the previous example, the information/data set may include telematics information/data, contextual information/data, and/or map information/data for a driver's stops for a specified work day, such as Route 1, Stops 1-6 on 12/30/2014; Route 2, Stops 1-6 on 12/30/2014; Route 3, Stops 1-6 on 12/30/2014; the segments between Stops 1 and 2 of Route 1; the segments between Stops 2 and 3 of Route 1; and/or the like. The information/data set (e.g., various information/data records) may include all available information/data (e.g., collected over a period of time) or a subset of the available information/data.

In one embodiment, an information/data record of telematics information/data may comprise a plurality of information/data fields each representing speed information/data, emissions information/data, RPM information/data, tire pressure information/data, oil pressure information/data, seat belt usage information/data, distance information/data, fuel information/data, idle information/data, latitude information/data, longitude information/data, altitude information/data, heading or direction information/data, geocode information/data, course information/data, speed information/data, and/or the like. An information/data record of contextual information/data may comprise a plurality of information/data fields each representing contextual information/data, such as date, time, driver, vehicle, logged reason for and location of the information/data capture information/data capture, and/or the like. Thus, the information/data fields of the telematics information/data can be matched or coordinated with the information/data fields of the contextual information/data by timestamps, for example. For instance, by storing telematics information/data in association with contextual information/data, the mapping computing entity 110 may later access and retrieve information/data from the same by searching the stored information/data by date, time, driver, vehicle, logged reason for and location of the information/data capture information/data capture, serviceable point, geocode, latitude and longitude point, or any other information/data field or combination of information/data fields associated with the stored telematics information/data.

Additionally, the mapping computing entity 110 can access or retrieve map information/data corresponding to the telematics information/data and/or contextual information/data, and/or geographic areas (Blocks 500, 505 of FIG. 5). For instance, the map information/data may include geographic areas (e.g., area codes, zip codes, counties, states), planned or traveled routes, the locations of planned or traveled stops along routes, planned or traveled distances associated with routes and stops (e.g., total planned or estimated distance for a route, planned or estimated distances between stops), planned times associated with various routes and stops (e.g., planned or estimated times for travel between stops, planned or estimated times for executing a delivery at a particular stop), planned directions associated with various routes and stops, and/or the like. In one embodiment, if only addresses are provided as starting and ending points for the routes, the mapping computing entity 110 may determine the estimated locations of the starting and ending points for the locations on the street networks using techniques such as interpolation (e.g., the starting point being 1 Street Address, Anytown, Ga., with the ending point being 6 Street Address, Anytown, Ga.). Or, if only a geocodes or longitude and latitude points are provided as starting and ending points for the routes, the mapping computing entity 110 may determine the locations of the starting and ending points for the locations on the street network by identifying the nearest corresponding street segments to the specified points (e.g., the starting point being 33.7869128, −84.3875602 and the ending point being 32.8679228, −83.1123209). That is, points can be "snapped" to the nearest corresponding street segments, for example, via a perpendicular line from the provided points to the nearest corresponding street segments.

With the appropriate information/data, the mapping computing entity 110 can cause display of routes or portions/segments of routes actually traversed in a geographic area (by one or more vehicles 100) based on telematics data—including causing display of the locations visited, times visited, and distances traveled. The mapping computing entity 110 can also simultaneously cause display of the planned or estimated routes for the actually traversed routes for the geographic area based on map data—including the estimated distances of the planned or estimated routes. Further, the display may include one or more vehicles' 100 actual and planned movement from an origin location to a final destination location, one or more vehicles' 100 actual and planned movement for a specified period of time, the actual and planned start times and end times of one or more vehicles' 100 movement, the actual and planned total distance traveled for a specified time period, the actual and planned segmented distance traveled for a specified time period, and/or the like—see FIGS. 7-23A and 23B. In another example, the display may include one or more vehicles' 100 actual and planned movement from an origin (e.g., stop) to a destination (e.g., stop), the actual and planned start times and end times of one or more vehicles' 100 movement between stops, the actual and planned time of one or more vehicles' 100 movement between stops, the actual and planned total distance traveled between stops, the actual and planned segmented distance traveled between stops, and/or the like—see FIGS. 7-23A and 23B. Further, using the appropriate telematics information/data, contextual information/data, and/or map information/data, the mapping computing entity 110 can cause display of serviceable points based on telematics information/data and map information/data. As will be recognized, a variety of different information/data can be displayed via various computing entities to adapt to various needs and circumstances.

Figure 7:
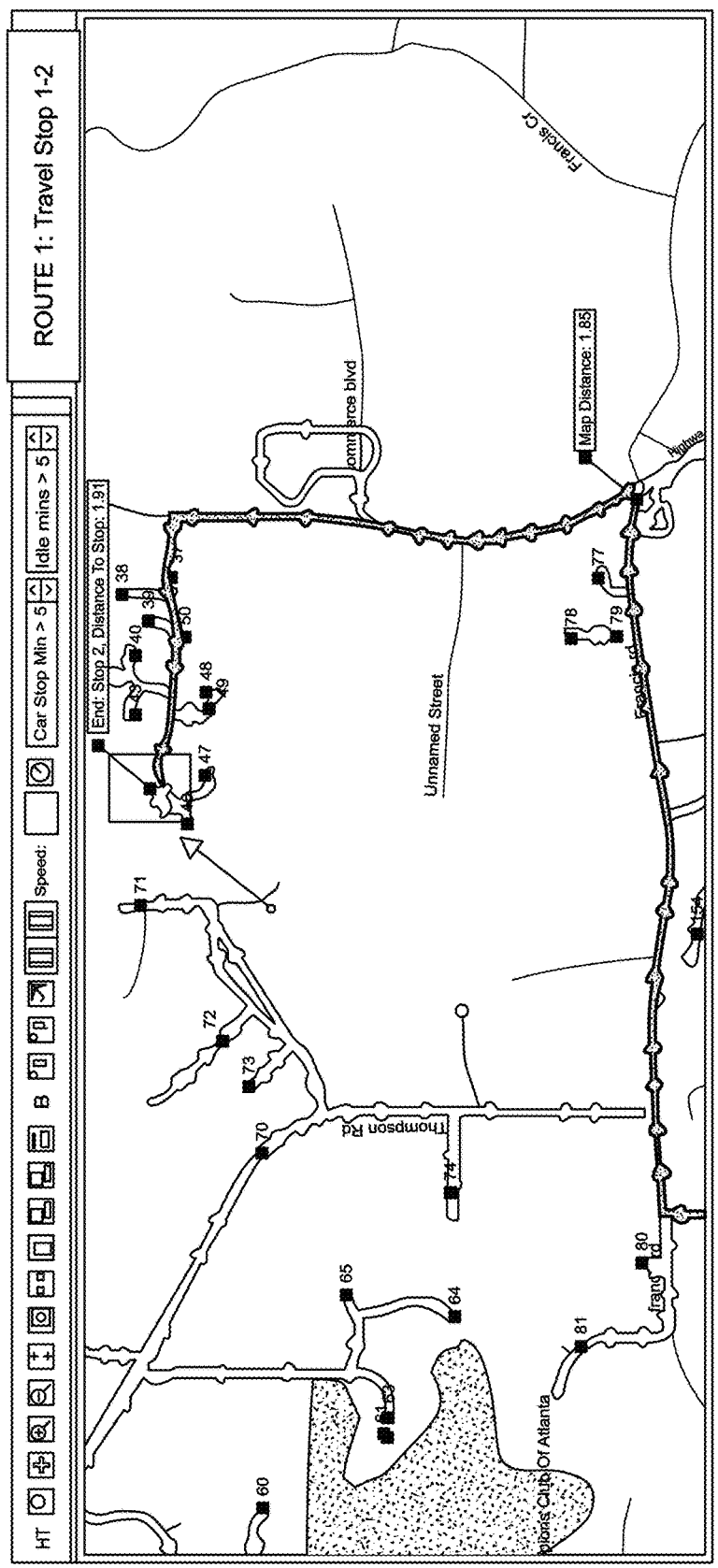
Figure 8:
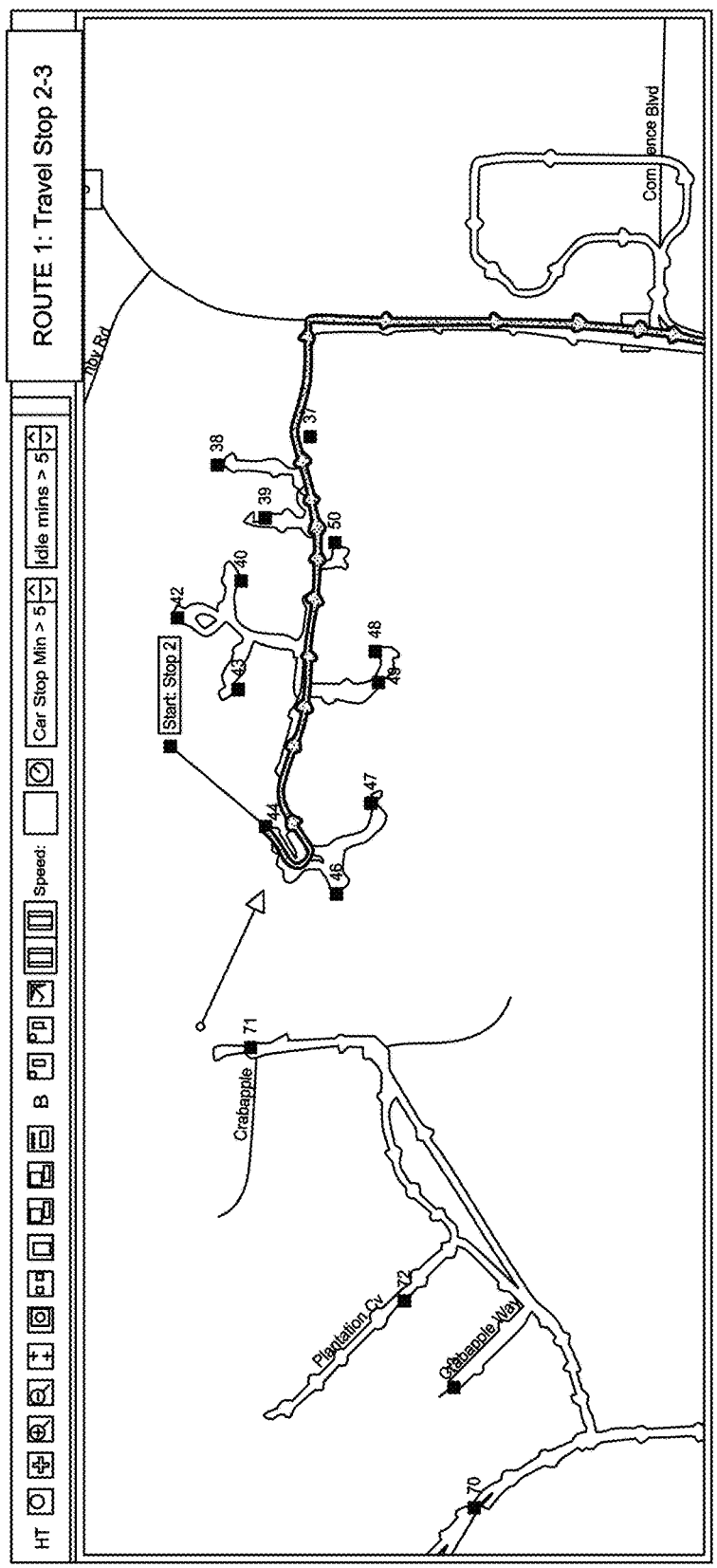
Figure 9:
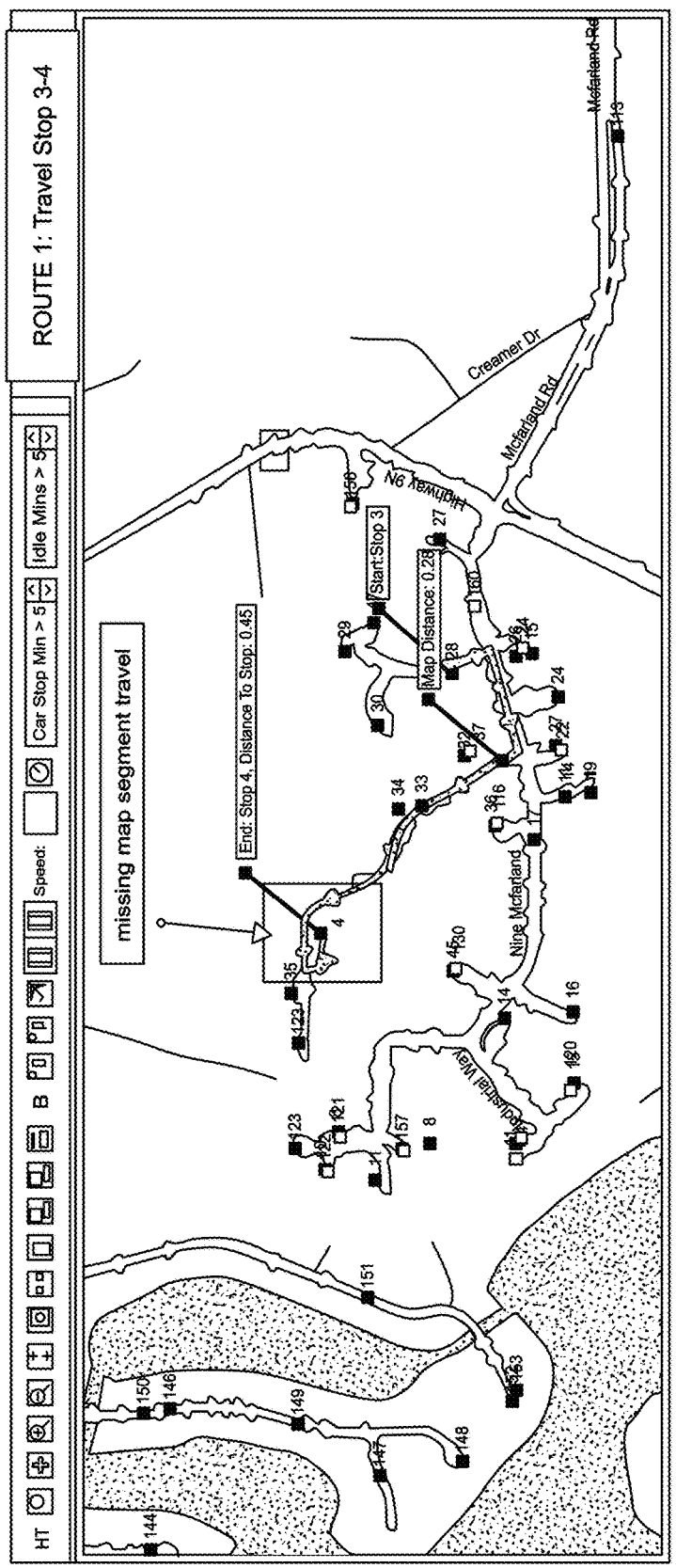
Figure 10:
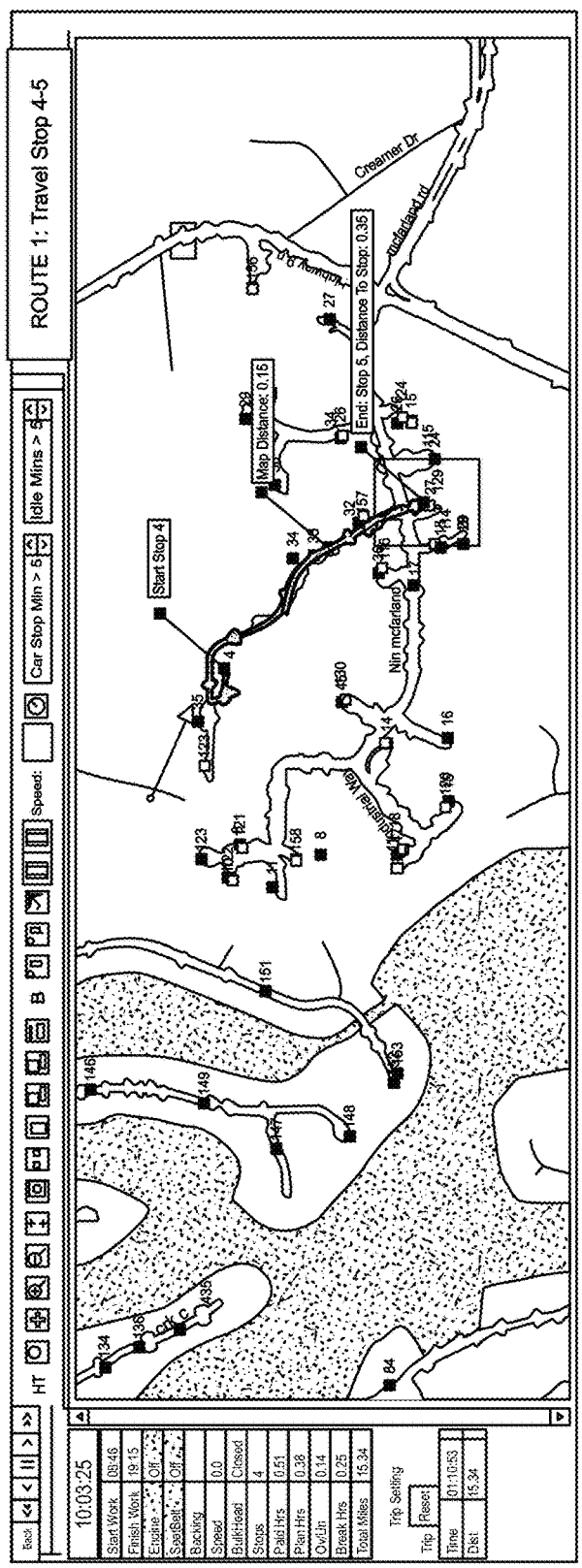
Figure 11:
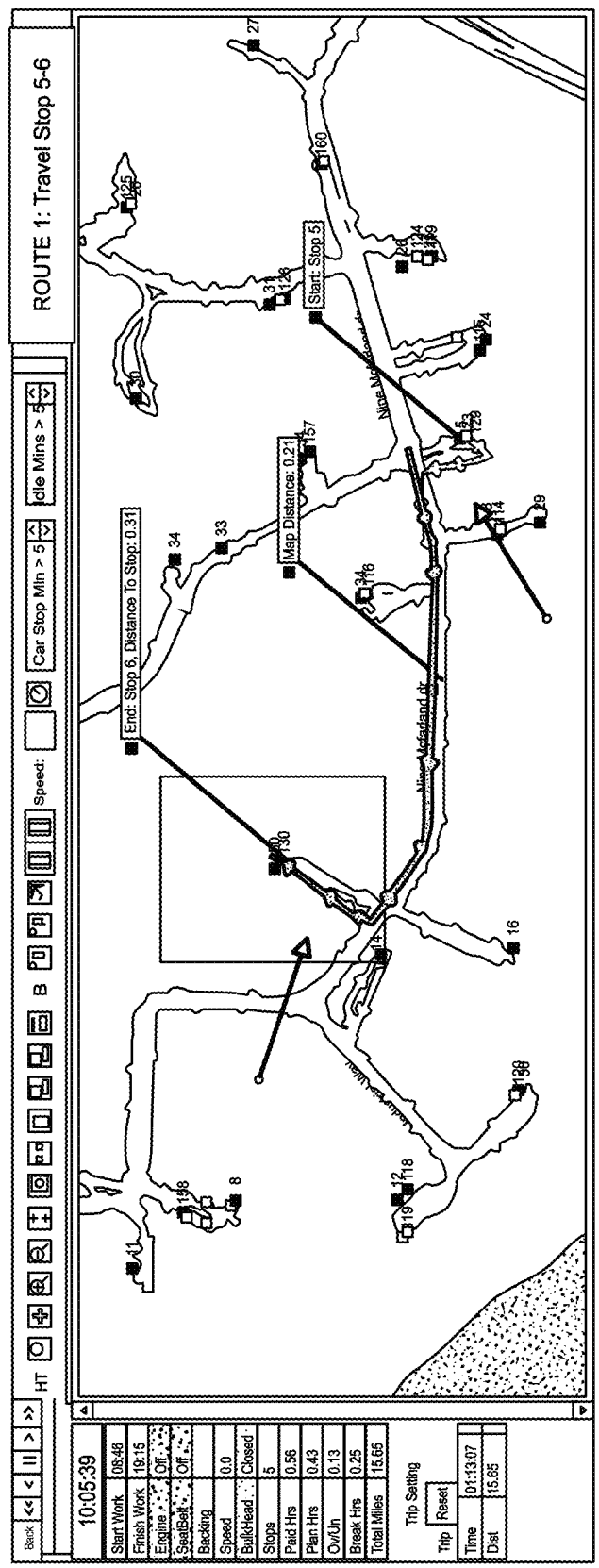
Figure 12:
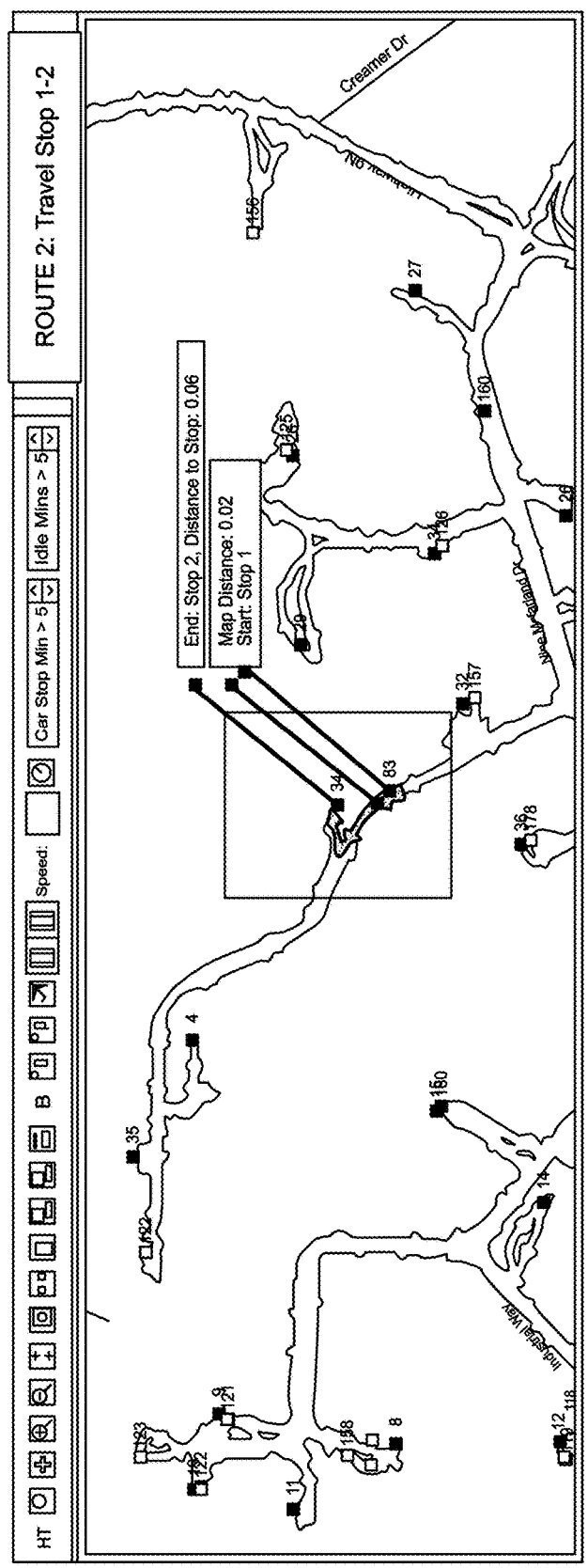
Figure 13:
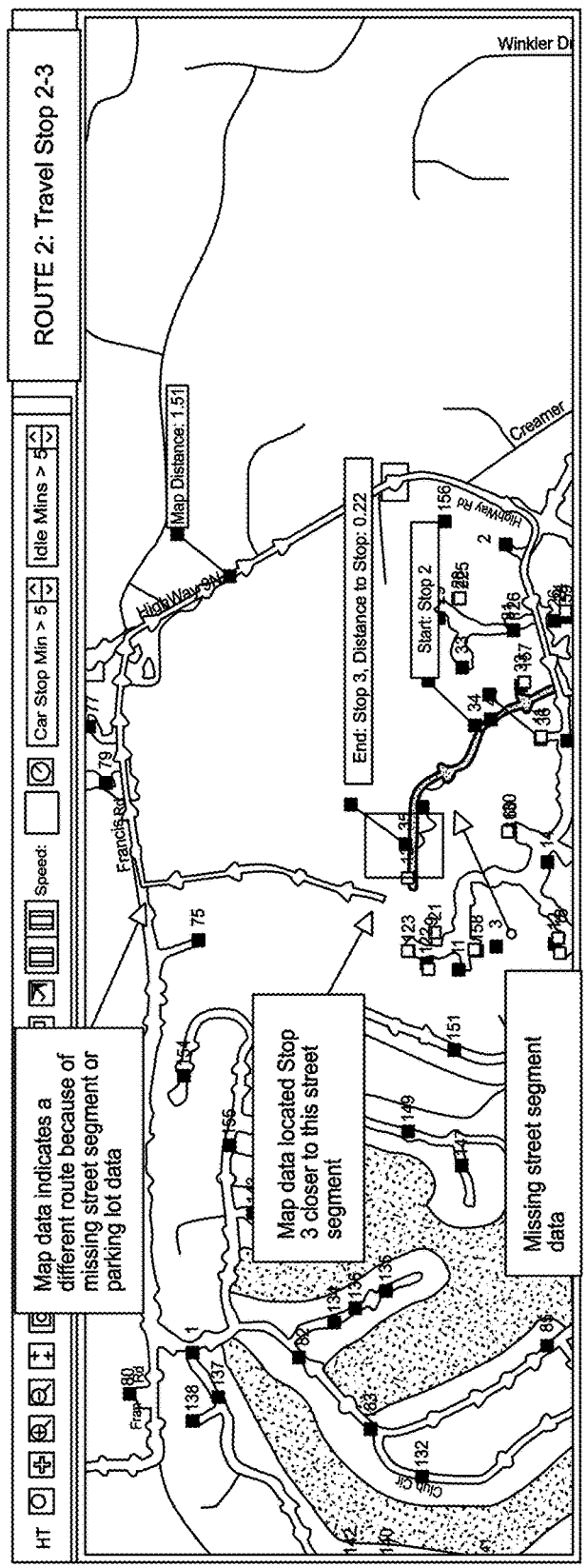
Figure 14:
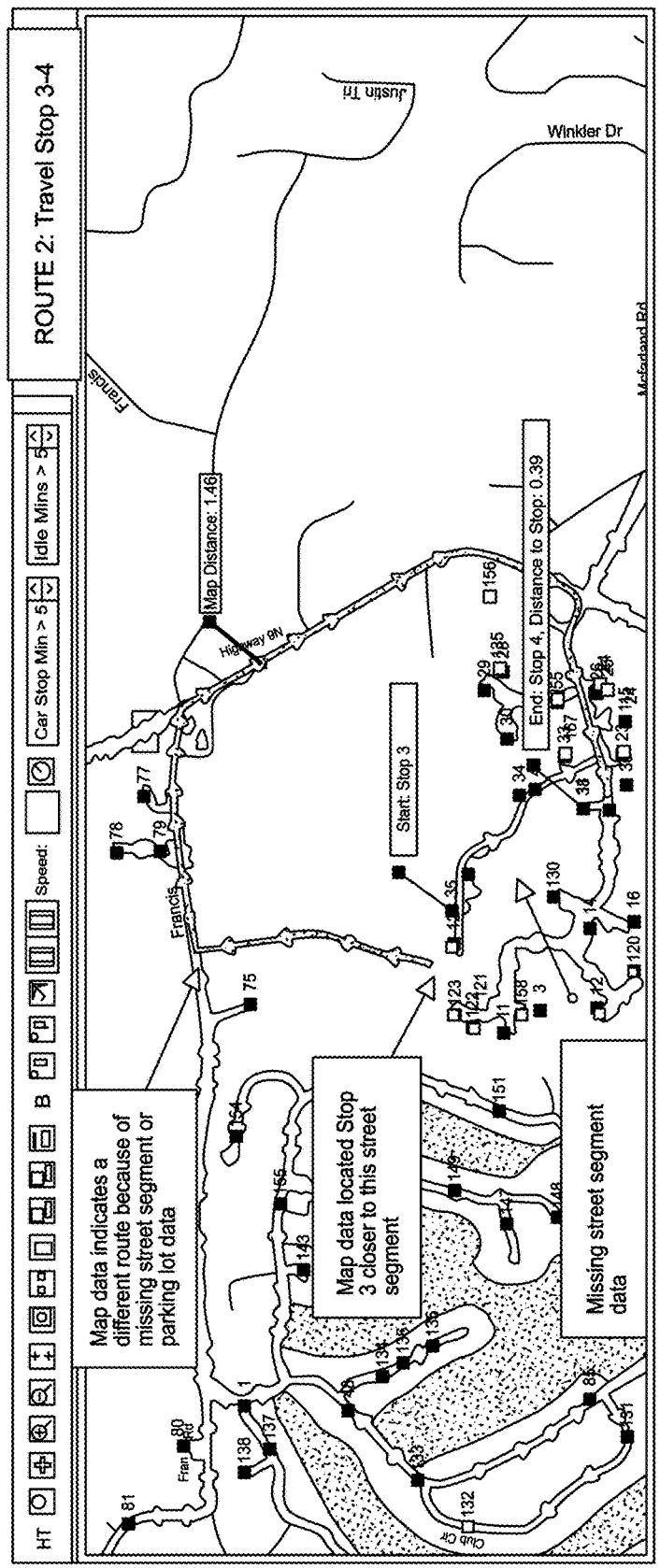
Figure 15:
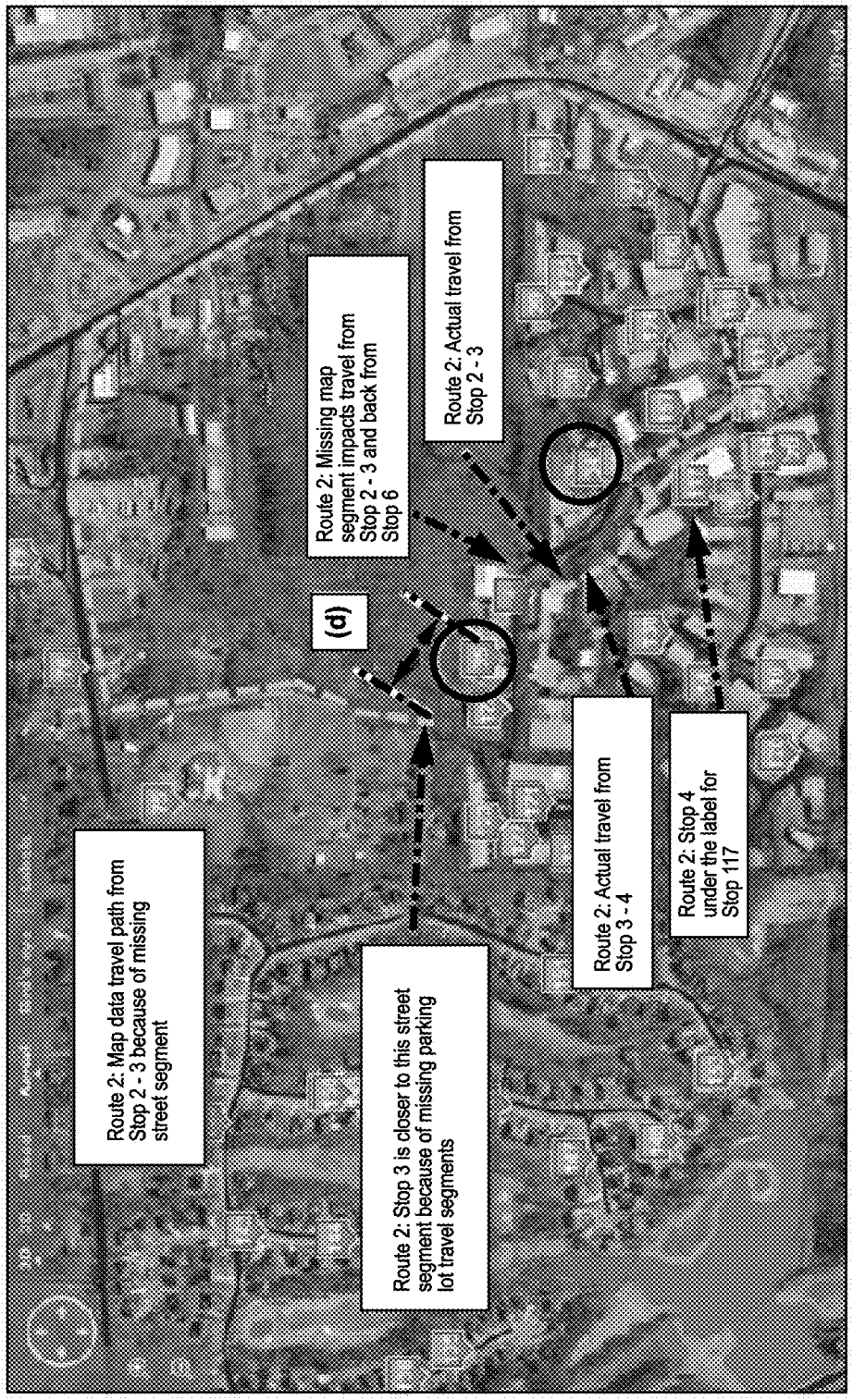
Figure 16:
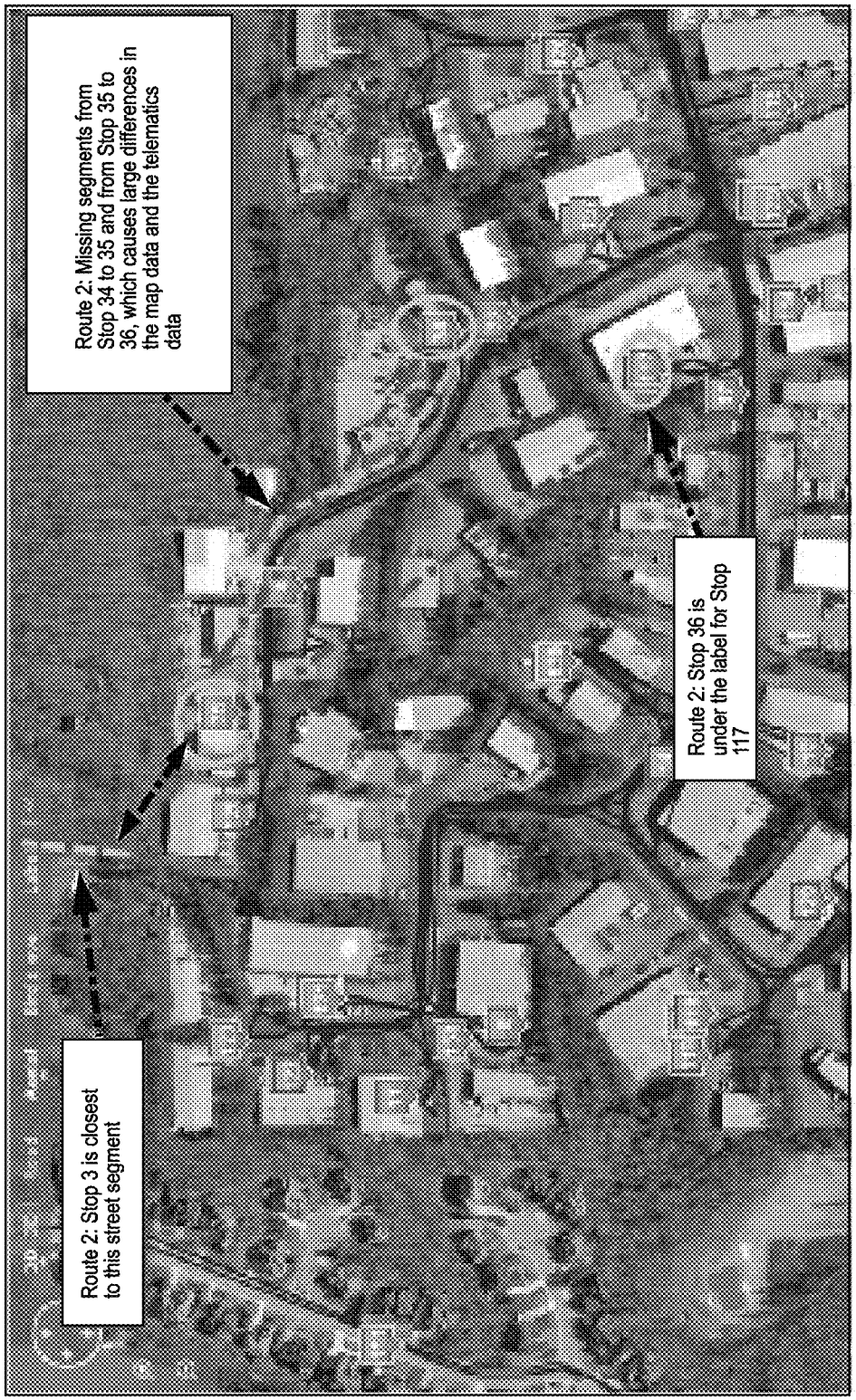
Figure 17:
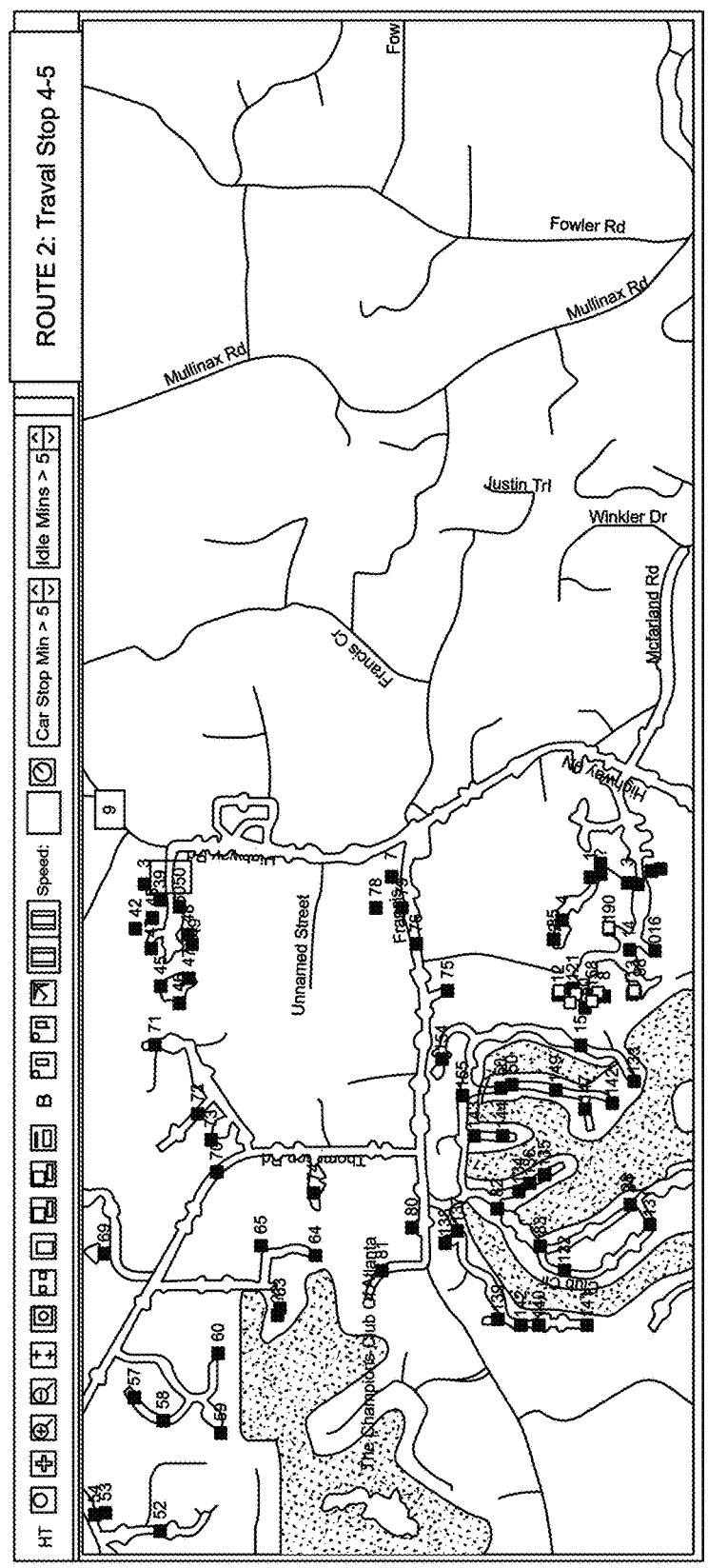
Figure 18:
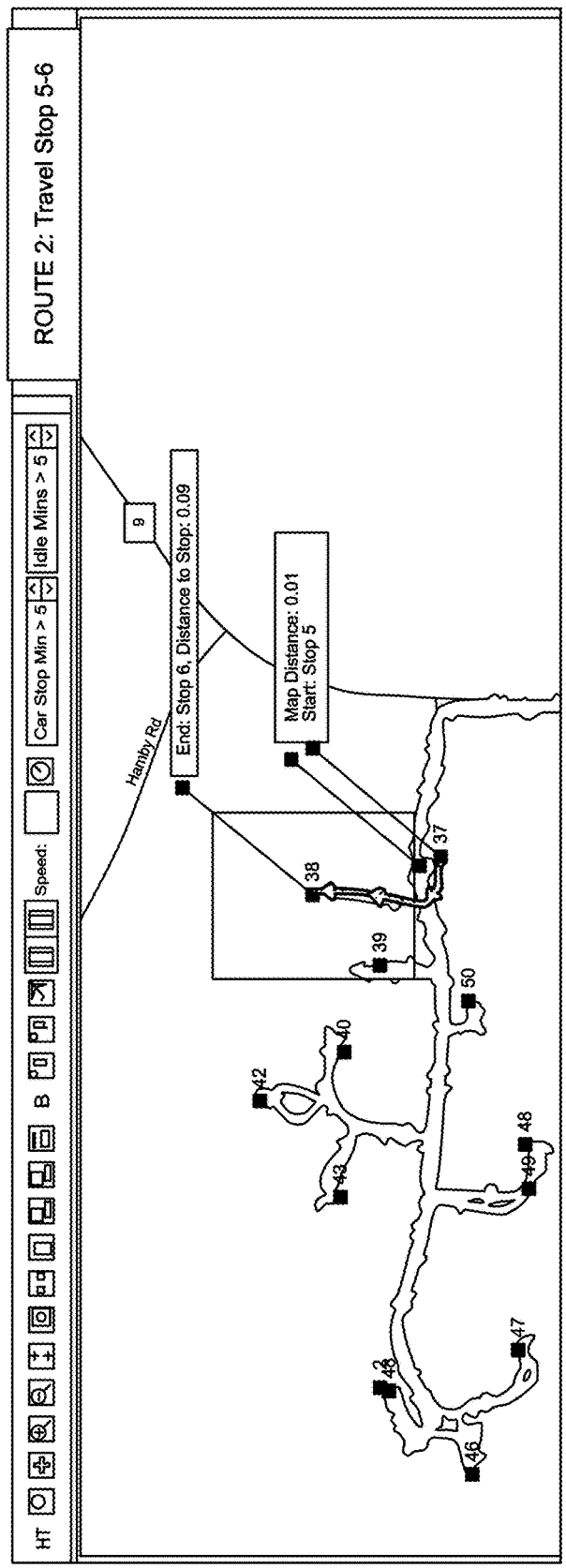
Figure 19:
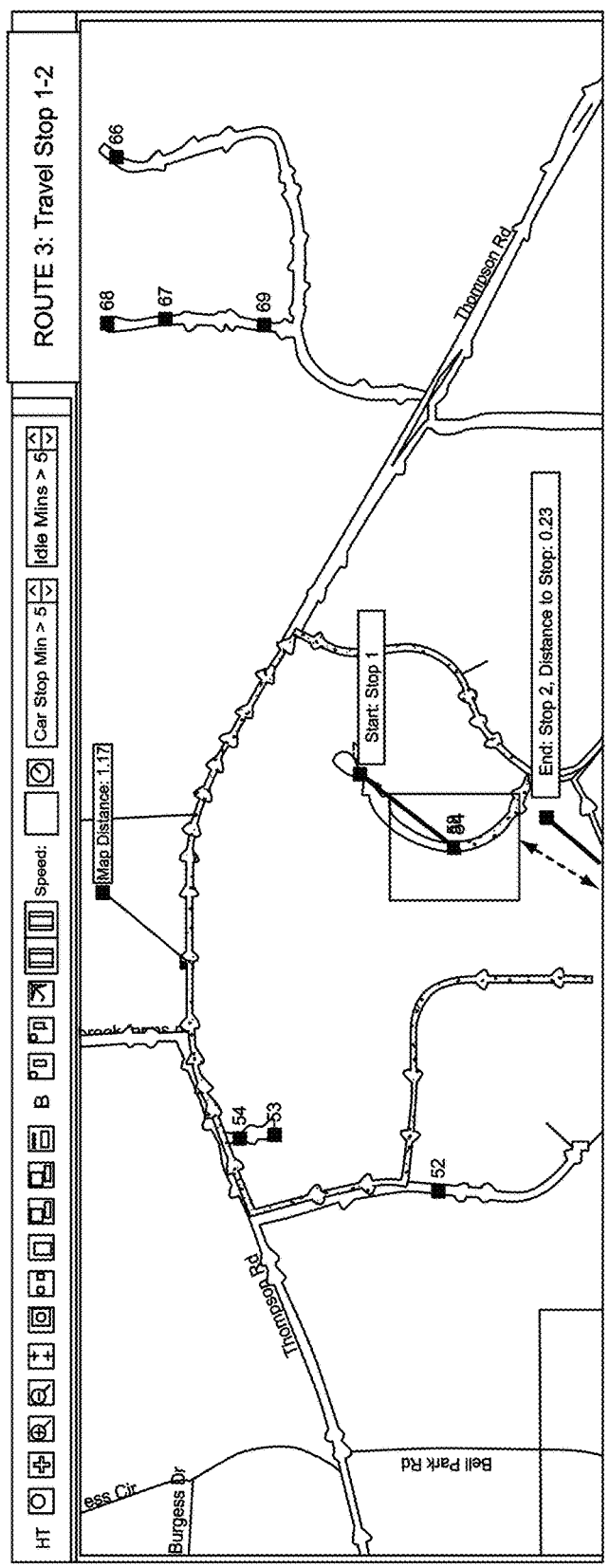
Figure 20:
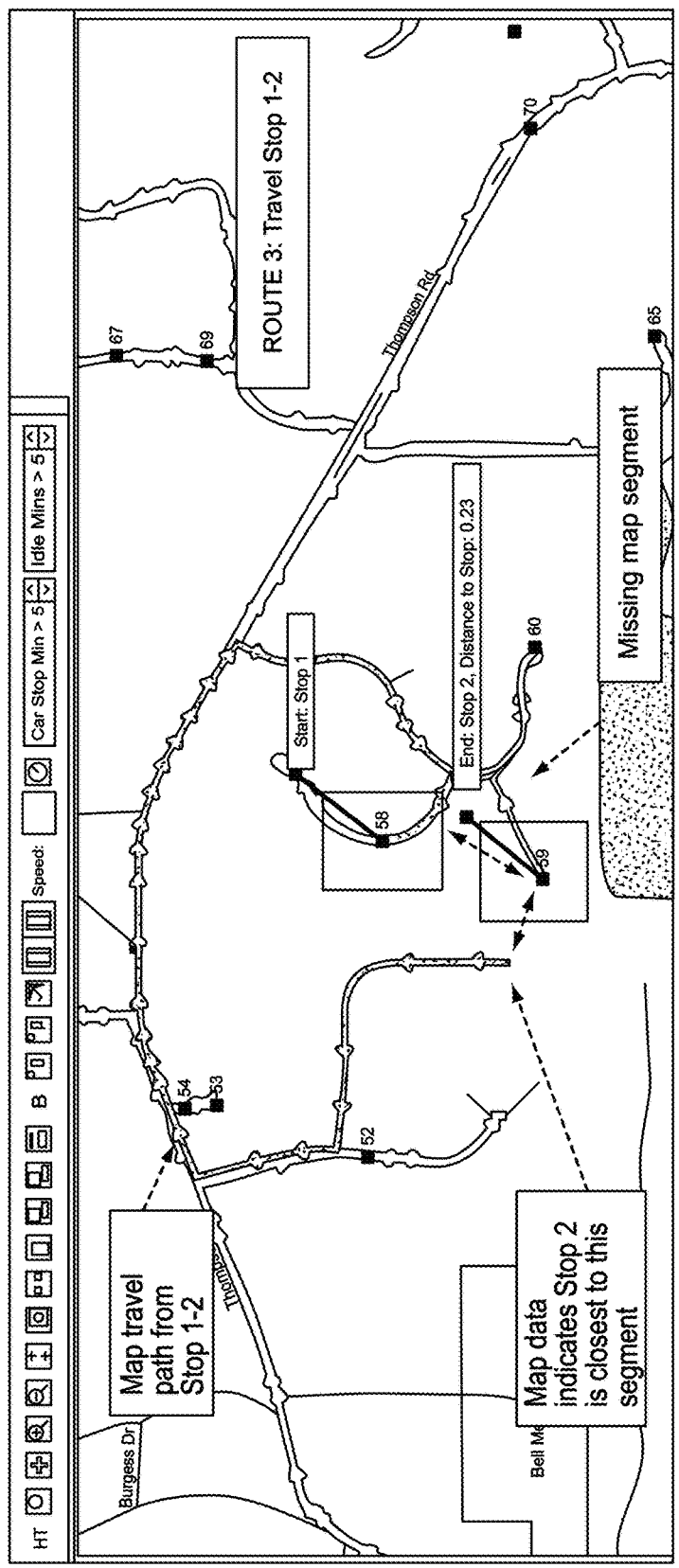
Figure 21:
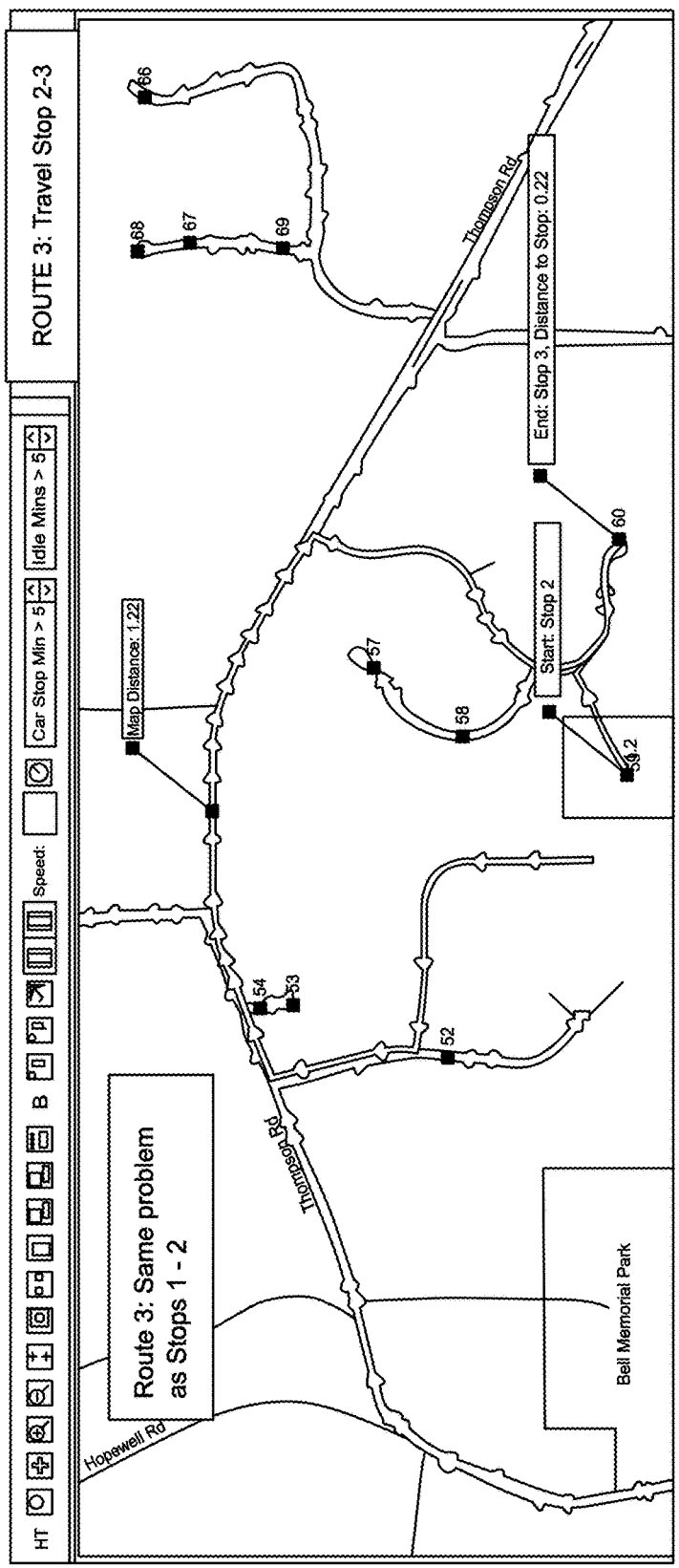
Figure 22:
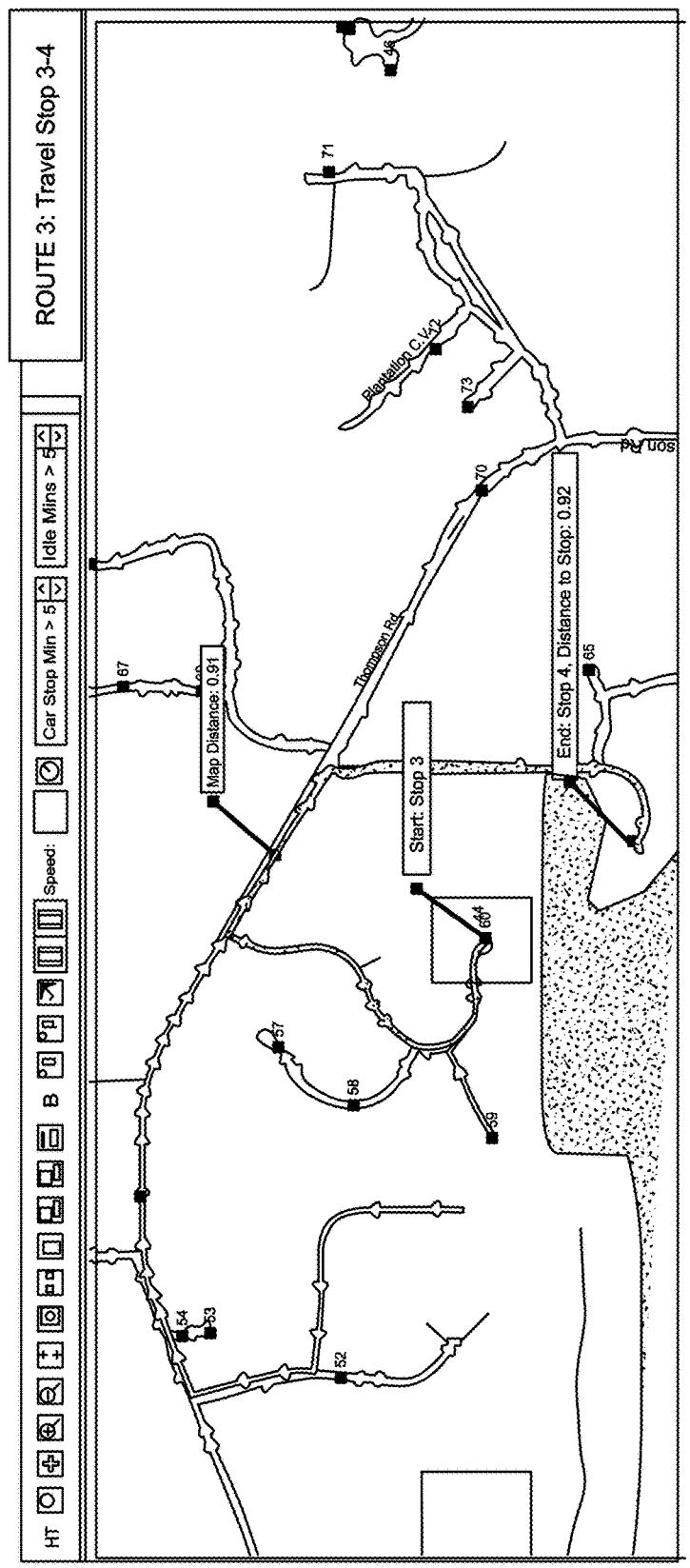
Figure 23A:
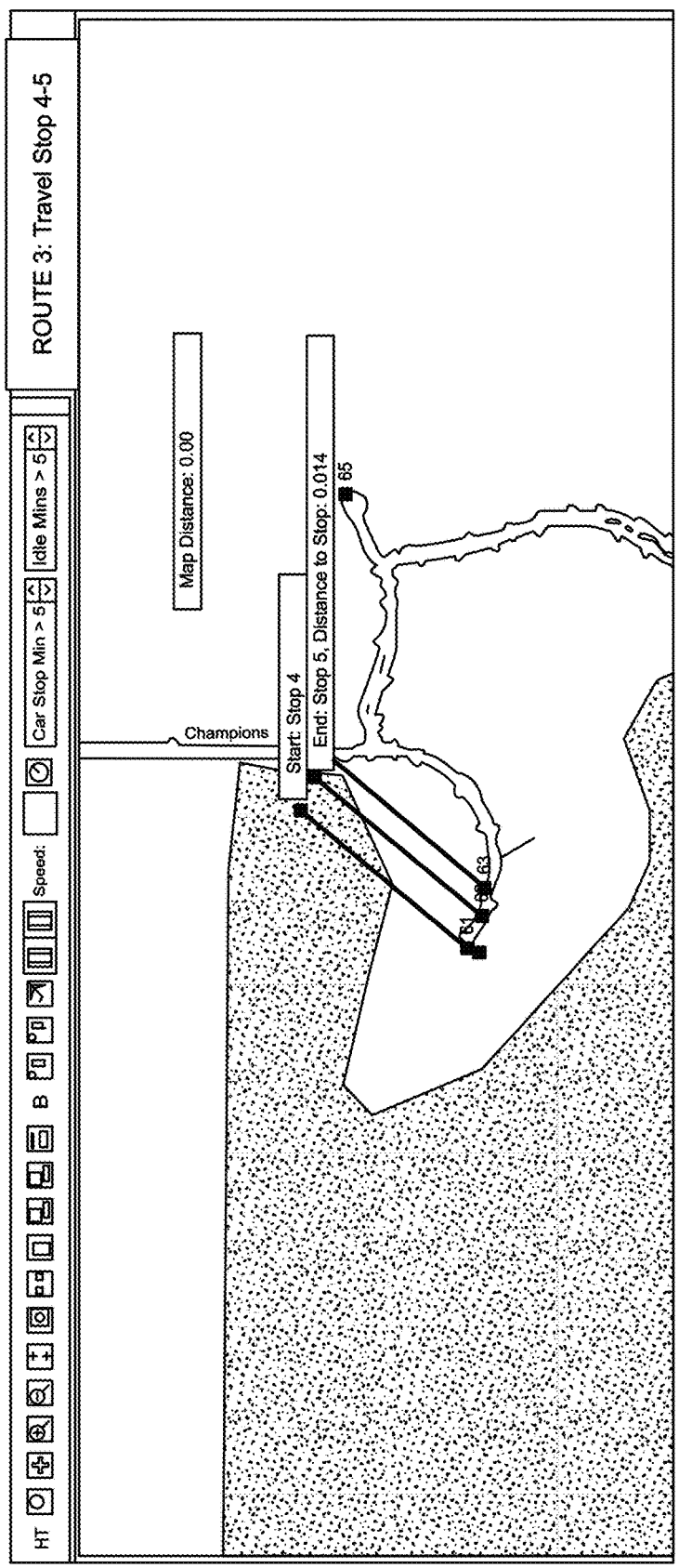
Figure 23B:
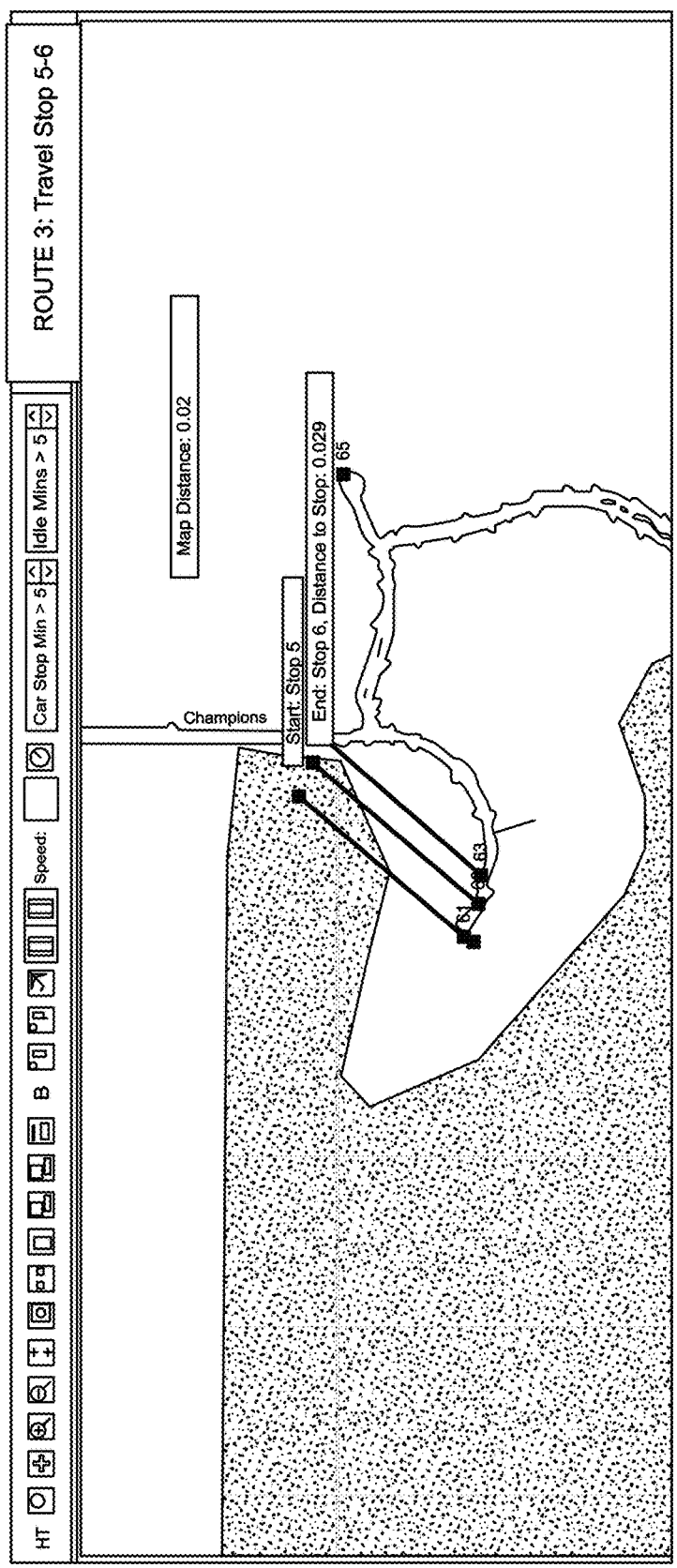

FIGS. 7-23A and 23B comprise telematics information/data, contextual information/data, and/or map information/data represented and displayed in graphical form of three different routes and segments of routes traveled for a geographic area (Route 1, Route 2, and Route 3). The routes and segments of routes may have been traveled/traversed/visited by one or more drivers over one or more time periods. These figures show graphical representations of the corresponding telematics information/data, contextual information/data, and/or map information/data for traveling between the respective stops. In these examples, portions of the telematics information/data are superimposed on portions of the map information/data. FIG. 7, for example, shows serviceable points (e.g., stops in this instance), the street network for traveling to various serviceable points, the planned or estimated route for traveling from Route 1, Stop 1 to Route 1, Stop 2 (green line), the actual travel route from Route 1, Stop 1 to Route 1, Stop 2 (red line), the estimated distance from Route 1, Stop 1 to Route 1, Stop 2 based on the map information/data (1.850 miles), the actual traveled distance from Route 1, Stop 1 to Route 1, Stop 2 based on telematics information/data (1.914 miles), and/or the like. FIGS. 8-23A and 23B show similar information/data for the respective routes, stops, street networks, and geographic areas. As will be recognized, although not necessarily displayed, the graphical representation may comprise various other map information/data, telematics information/data, and/or contextual information/data. For example, the mapping computing entity 110 can provide a visual indication to users as to the differences in the telematics information/data and map information/data for reconciliation purposes. The visual indications may be different line formats or colors, different line types, dialog boxes, and/or the like. For example, FIG. 15 shows the planned route based on map information/data in green dashed lines, the actual route based on telematics information/data in red dashed lines, and various dialog boxes indicating distances and the like.

In addition to causing display of relevant telematics information/data, contextual information/data, and/or map information/data, the mapping computing entity 110 can use the same to determine, evaluate, identify and similar words used herein interchangeably the accuracy of digital maps (e.g., the accuracy of map information/data of digital maps)—Blocks 510 and 515 of FIG. 5. For example, as shown in FIGS. 24, 31, and 32, the mapping computing entity 110 can determine, evaluate, identify and similar words used herein interchangeably the difference between the distance actually traveled for one or more routes or segments based on telematics information/data (e.g., the distances that one or more vehicles 100 actually traveled for the routes) and the estimated or planned distance for traveling the one or more routes or segments based on the map information/data. In FIG. 24, the mapping computing entity 110 can make this determination based on an entire route traveled as a whole or on a stop-by-stop basis. This may include determining the aggregate distance between the various points collected as telematics information/data either from the origin to the destination or between each stop. In FIG. 32, the mapping computing entity 110 can make this determination based on segment-by-segment basis to and from each stop in a route. To determine the map accuracy, the mapping computing entity 110 can compare the differences between the relevant map information/data and the relevant telematics information/data.

Continuing with the example of FIG. 24, based on the map information/data of a digital map, the planned or estimated distance for traveling from Route 1, Stop 1 to Route 1, Stop 2 is 1.850 miles is determined. In one embodiment, the mapping computing entity 110 can determine this distance based on the interpolated, reverse geocoded, and similar words used herein interchangeably locations of Stop 1 and Stop 2. However, based on the telematics information/data, the actual distance traveled from Route 1, Stop 1 to Route 1, Stop 2 is 1.914 miles. This is the aggregate distance between the two stops based on the collected telematics data—the linear or geographical distance between each collected point between the two stops. The difference in the planned or estimated distance traveled and the actual distance traveled is 0.064 miles (or −0.064 in underage). This underage indicates that the map information/data is −3.336% off for the travel between these two stops (e.g., 0.064/1.914). As with the distance traveled from Route 1, Stop 1 to Route 1, Stop 2, a similar determination can be made for each stop for every identified route. For example, as shown in FIG. 24, the mapping computing entity 110 determined the distance between each stop: each stop between Route 1, Stop 1 and Route 1, Stop 6; each stop between Route 2, Stop 1 and Route 2, Stop 6; and each stop between Route 3, Stop 1 and Route 3, Stop 6. As shown in FIG. 24, the differences between the distance for the stops on Routes 1, 2, and 3 range from an underage of −0.204 actual miles to an overage of 1.289 actual miles between stops.

Continuing with the example of FIG. 32, based on the map information/data of a digital map, the planned or estimated distance for traveling from Route 1, Stop 1 to Route 1, Stop 2 is 1.850 miles is determined. The individual segments comprising the 1.850 miles are 0.390 miles (segment 1), 0.720 miles (segment 2), 0.490 miles (segment 3), and 0.250 miles (segment 4). However, based on the telematics information/data, the actual distance traveled from Route 1, Stop 1 to Route 1, Stop 2 is 1.914 miles. The individual segments comprising the 1.914 miles are 0.390 miles (segment 1), 0.720 miles (segment 2), 0.554 miles (segment 3), and 0.250 miles (segment 4). The difference in the planned or estimated distance traveled and the actual distance traveled is 0.064 miles (or −0.064 in underage), which only relates to segment 3. This underage indicates that the map information/data for segment 3 is −13.061% off for the specified travel (e.g., 0.064/0.490). A similar determination can be made for the travel from Stop 2 to Stop 3 of Route 1. Based on the map information/data of a digital map, the planned or estimated distance for traveling from Route 1, Stop 2 to Route 1, Stop 3 is 1.630 miles. The individual segments comprising the 1.630 miles are 0.370 miles (segment 1), 0.650 miles (segment 2), 0.400 miles (segment 3), 0.200 miles (segment 4), and 0.010 miles (segment 5). However, based on the telematics information/data, the actual distance traveled from Route 1, Stop 1 to Route 1, Stop 2 is 1.806 miles. The individual segments comprising the 1.914 miles are 0.370 miles (segment 1), 0.650 miles (segment 2), 0.400 miles (segment 3), 0.366 miles (segment 4), and 0.166 miles (segment 5). The difference in the planned or estimated distance traveled and the actual distance traveled of segment 4 is 0.166 miles (or −0.166 in underage) and segment 5 is 0.010 miles (or −0.010 in underage). This underage indicates that the map information/data for segment 4 is −83.000% off and segment 5 is −100% off for the specified travel.

In addition to making these types of determinations on a stop-by-stop basis, the mapping computing entity 110 can make such determinations for an entire route or geographic area including various stops. For instance, as also shown in FIG. 24, the planned or estimated distance between the various stops on the three routes is 12.090 miles based on the map information/data. This is the aggregate distance between each of the respective stops for the three routes based on the map information/data. However, based on the telematics information/data, the actual distance traveled between the stops was 8.813 actual miles. This is the aggregate distance between each of the respective stops on the three routes based on the telematics information/data. Thus, there is a difference of 3.277 miles between the telematics information/data and the actual information/data (e.g., an overage of 3.277 miles). This indicates that the map information/data is inaccurate or off by approximately 37.191% for the travel between the various stops (e.g., 3.277/8.813) for these three routes. As will be recognized, a variety of other approaches and techniques can be used to adapt to various needs and circumstances.

In FIGS. 24-27, the differences shown in negative numbers represent where the actual distance traveled (e.g., based on the telematics data) is greater than the planned or estimated distance (e.g., based on the map data). This indicates that the map information/data is under in terms of the planned or estimated distances compared to the actual distance (e.g., an underage). Similarly, the differences shown in positive numbers represent where the actual distance traveled (e.g., based on the telematics data) is less than the planned or estimated distance (e.g., based on the map data). This indicates that the map information/data is over in terms of planned or estimated distances compared to actual distance (e.g., an overage). The same is true for the percentages. That is, negative percentages indicate that the actual distance traveled was greater than the planned or estimated distance traveled. Positive percentages indicate that the actual distance traveled was less than the planned or estimated distance traveled.

In addition to the above, in evaluating map accuracy, the mapping computing entity 110 can also take into account certain types of travel of interest that should be excluded from the accuracy determination, e.g., turn-around travel, excess travel, break travel, configurable tolerance travel, duplicate travel, and/or the like. Thus, the mapping computing entity 110 can remove these types of travel from the map accuracy determinations for more precise determinations, for example, to account for noise or inaccurate collections of telematics information/data. To do so, these types of travel must first be identified and then be removed from consideration. To identify turn-around travel, for instance, the mapping computing entity 110 can identify travel in which a vehicle's 110 heading changed to within a configurable range from 180° on the same street segment (e.g., 160° to 200°) and/or within a certain time period. Similarly, to identify duplicate travel, the mapping computing entity 110 can identify travel of the same heading or direction on the same street segment. The duplicate travel concepts are described in U.S. application Ser. No. 14/046,172, which is hereby incorporated in its entirety by reference. Further, the mapping computing entity 110 can identify configurable tolerance travel. For instance, the mapping computing may identify differences in distance that are within the configurable tolerance travel, such as 50, 100, 150, 200, or 500 feet. This may be to account for inaccuracy in the information/data collection of the telematics information/data and/or for a variety of other reasons. Thus, if the difference in the map information/data and the telematics information/data for a particular street segment or segment of travel is less than fifty feet, the mapping computing entity 100 can identify the disparity as being within the configurable tolerance travel. As will be recognized, a variety of other approaches and techniques can be used to adapt to various needs and circumstances.

After identifying the types of travel of interest (e.g., turn-around travel, excess travel, break travel, configurable tolerance travel, duplicate travel, and/or the like), the mapping computing entity 110 can remove them from the map accuracy determinations. For instance, as shown in FIG. 24, the mapping computing entity 110 has identified 0.080 miles of excess driver travel from Route 1, Stop 3 to Route 1, Stop 4. Similarly, the mapping computing entity 110 has identified 0.060 miles of turn-around travel for Route 3, Stop 1. Thus, this travel can be removed from the individual travel segments (for individual determinations) or from the entire gross travel (for gross determinations). FIG. 25 represents the travel segments in which the actual travel distances are greater than the planned or estimated distances (e.g., underages in map data). In these examples, because the excess driver travel and the turn-around travel occurred in these underages, the mapping computing entity 110 can remove them from consideration. In this example, as shown in FIG. 25, the total gross distance traveled (7.749 miles) is reduced by the excess travel and the turn-around travel (0.140 miles combined). Thus, the total actual distance traveled is 7.609 miles after adjustment. With the adjusted mileage, for the underages, the map information/data is off by or inaccurate for −0.879 miles or −11.547%. For the overages, however, the four travel segments shown in FIG. 26 are not associated with any of these types of travel of interest. Thus, the total actual distance traveled is 1.064 miles compared to the 5.360 miles of planned or estimated travel. In other words, for the overages, the map information/data is off by or inaccurate for 4.296 miles or 403.783%. As will be recognized, a variety of other approaches and techniques can be used to adapt to various needs and circumstances.

With the underages and overages, the mapping computing entity 110 can determine the overall map accuracy for the map information/data being considered (e.g., routes, segments, areas, and/or the like). As indicated, this can be done for a single route, multiple routes, geographic areas, and/or the like. For example, as shown in FIG. 27, for the underage, the actual distance traveled is 7.609 miles based on the telematics information/data, while the planned or estimated distance is 6.730 miles based on the map information/data. This results in the map information/data being −11.547% inaccurate (−0.879 miles) in terms of under estimating the distances for the three routes under consideration. Similarly, for the overage, the actual distance traveled is 1.064 miles based on the telematics information/data, while the planned or estimated distance is 5.360 miles based on the map information/data. This results in the map information/data being 403.783% inaccurate (−1.064 miles) in terms of over estimating the distances for the three routes under consideration. Further, the mapping computing entity 110 can determine the map accuracy for both the overages and underages. As shown in FIG. 27, the absolute value of the differences of overages and underages is 5.175 miles for the three routes under consideration. The total actual distance traveled is 8.673 miles, including adjustments. This indicates that the map information/data is inaccurate or off by approximately 59.667%.

In one embodiment, in addition to determining the accuracy of map information/data, the mapping computing entity 110 can determine the underlying reasons of the inaccuracies. For example, in certain embodiments, the inaccuracies may be because parking lots and parking lot travel paths that are traversed or traveled are either not part of the map information/data or are inaccurate in the map information/data. To update the map information/data of digital maps to include missing parking lots/parking lot travel paths and/or to correct the information/data for parking lots/parking lot travel paths, the mapping computing entity can perform the processes described in U.S. application Ser. No. 13/795,290—which is hereby incorporated in its entirety by reference. As described in the patent application, travel paths in parking areas can be defined by connecting serviceable points of street networks within the parking areas. Or, such defined travel paths can be merged with actual paths traveled by vehicles in the parking areas.

In one embodiment, in addition to determining the accuracy of map information/data, the mapping computing entity 110 can provide an indication (e.g., flag) for routes, segments, and/or the like satisfying a configurable inaccuracy threshold. For instance, in one embodiment, after make one or more accuracy determinations, the mapping computing entity 110 can provide an indication (e.g., flag) for all routes or segments meeting or exceeding a configurable percentage, such as 25% (or any other percentage). In another embodiment, the mapping computing entity 110 can provide an indication (e.g., flag) for all routes or segments meeting or exceeding a configurable distance, such as 0.25 miles (or any other distance). FIG. 33 shows a record for a segment that has been indicated as satisfying (e.g., meeting or exceeding) the configurable inaccuracy threshold. As seen in FIG. 33, the determined error of the map data in feet is 2,587.20 feet or 0.49 miles.

In one embodiment, by indicating (e.g., flagging) routes or segments, a variety of reports can be generated. For instance, the mapping computing entity 110 can provide reports for routes, route segments, parking locations, highways, trails, alleys, paths, walkways, streets, street segments, roads, zip codes, area codes, cities, counties, states, provinces, countries, and/or the like. To do so, the mapping computing entity 110 can provide an interface for users to interact with various reports. For instance, FIG. 33 shows a report for Route 1 that identifies all route segments of that are greater than 10% inaccurate (both underages and overages). To generate this report, the mapping computing entity 110 identifies all of the routes and segments for Route 1 that have been indicated (e.g., flagged) as satisfying the 10% inaccuracy threshold. Similarly, FIG. 34 shows a report for zip code 30092 that identifies all route segments of that are 0.1 miles or more inaccurate (both underages and overages). To generate this report, the mapping computing entity 110 identifies all of the routes and segments in the zip code 30092 that have been indicated (e.g., flagged) as satisfying the 0.1 mile inaccuracy threshold. As also seen in these figures, the user can adjust both the report type (e.g., area, route, segment and/or the like) and filter (e.g., distance, percentage, and/or the like). As will be recognized, a variety of other techniques and approaches can be used to adapt to various needs and circumstances.

Similarly, to update the map information/data of digital maps to include missing street segments and/or to correct the information/data for street segments, the mapping computing entity 110 can perform the steps described in U.S. application Ser. No. 13/435,755—which is hereby incorporated in its entirety by reference. As described in the patent application, the mapping computing entity 110 can update digital maps by assessing map information/data and telematics information/data to identify portions/segments of a vehicle path that do not correspond to known travel paths. In various embodiments, the mapping computing entity 110 can then define these identified portions/segments as new known travel paths/segments in the map information/data corresponding to a public road, private road, and/or the like. The mapping computing entity 110 can then update the map information/data correspondingly. Updating all of the inaccuracies in the map information/data can greatly increase the usefulness and accuracy of the map information/data. However, even updating just the outliers in the map information/data, the usefulness and accuracy of the map information/data.

By way of example, in FIG. 15, the map information/data indicates that the planned or estimated distance of travel from Route 2, Stop 2 to Route 2, Stop 3 is 1.510 miles. This is shown in the green dashed line. However, the actual travel based on the telematics information/data is 0.221 miles. This is shown in the red dashed line. The reason the map information/data indicates a greater distance (1.289 miles or 583.382%) is because the map information/data is missing one or more street segments that provide the shortest route between the two stops. And although the map information/data is incorrect, the driver of the vehicle traveled the correct and shortest route between Route 2, Stop 2 and Route 2, Stop 3. This creates the differences in the map information/data and the telematics information/data. The mapping computing entity 110 can cause display of these differences, problem areas, or outliers by displaying the different types of information/data using different colors, lines styles, and or the like. This can alert a user of the disparity in the information/data and lead to a correction of the map information/data. And as previously described, the mapping computing entity 110 can update the map information/data to reflect the telematics information/data. As will be recognized, a variety of approaches and techniques can be used to adapt to various needs and circumstances.

ii. Example Two: Serviceable Points in Geographic Areas

Figure 28:
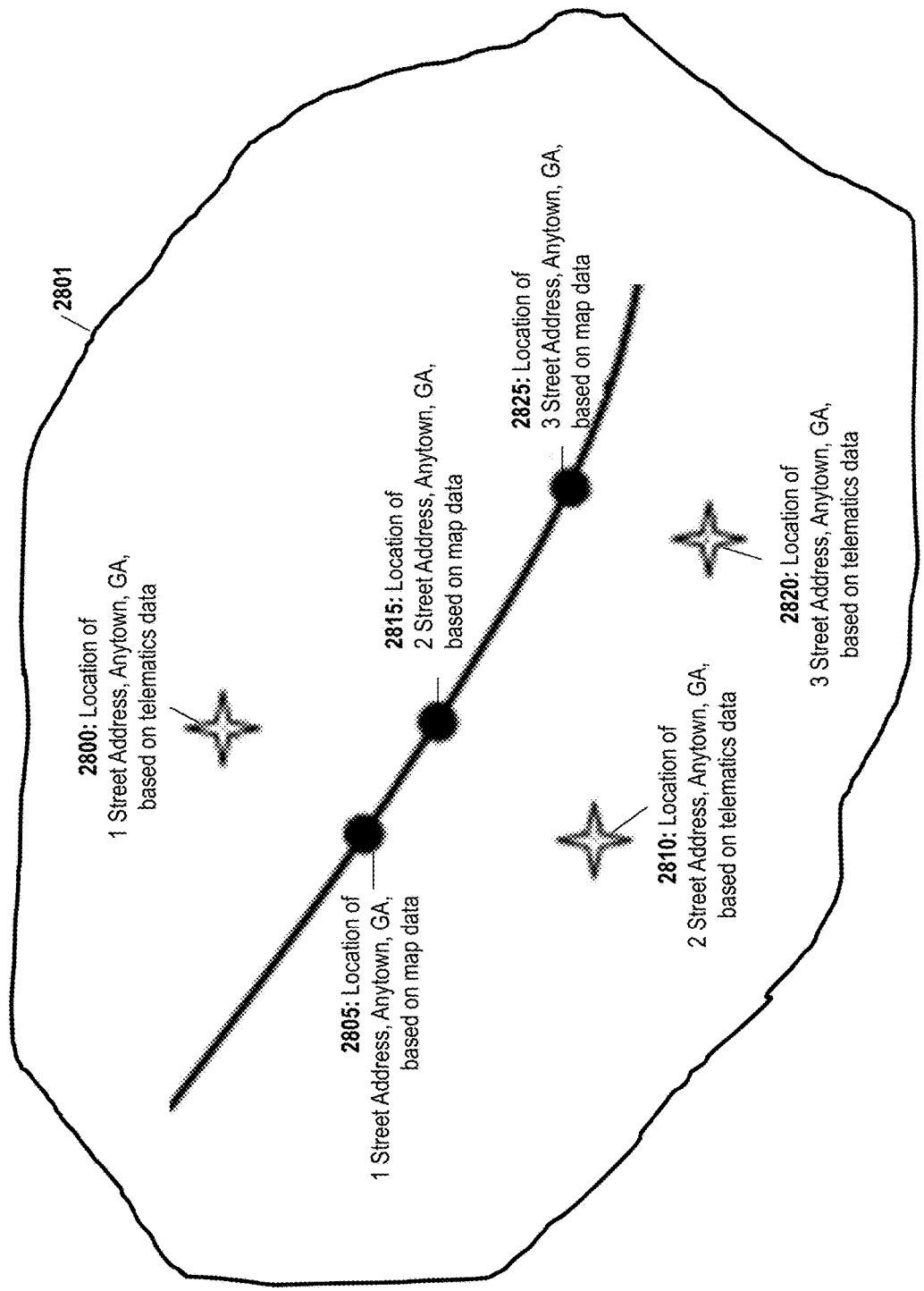

In one embodiment, the mapping computing entity 110 can determine the map accuracy associated with a geographic area based on serviceable points (e.g., in a manual, semi-automatic, or automatic manner). In one embodiment, the process may begin when the mapping computing entity 110 receives a request that may originate from a variety of computing entities (e.g., from a user computing entity 135) to determine the map accuracy for one or more serviceable points or one or more geographic areas. For example, the mapping computing entity 110 may receive a request to determine the map accuracy for zip code 30092 or Anytown, Ga. In another embodiment, the mapping computing entity 110 can receive a request to determine the map accuracy for an area designated via input from a user computing entity 135 by, for example, a user drawing a polygon around the geographic area using an input mechanism, selecting displayed portions of the map, defining a geofence, and/or the like. FIG. 28 shows a polygon 2701 received as user input drawn around a geographic area. As will be recognized, a variety of approaches and techniques can be used to adapt to various needs and circumstances.

In one embodiment, responsive to such requests, the mapping computing entity 110 can identify serviceable points for which telematics information/data has been collected corresponding to the geographic area. Continuing with the above example, responsive to a request for determining the accuracy of geographic area associated with the polygon 2701, the mapping computing entity 110 may identify all of the serviceable points within the specified geographic area for which telematics information/data has been collected. In another embodiment, the mapping computing entity 110 may receive a request to determine the map accuracy of single serviceable point: 1 Street Address, Anytown, Ga. In another example, the mapping computing entity 110 may receive a request to determine the map accuracy of multiple serviceable points: 1 Street Address, Anytown, Ga.; 2 Street Address, Anytown, Ga.; and 3 Street Address, Anytown, Ga.

In one embodiment, the map accuracy of a geographic area or a serviceable point can be determined by the mapping computing entity 110 as the distance between the location of the serviceable point as indicated by the map information/data and the location of the serviceable point as indicated by the telematics information/data. In another embodiment, the map accuracy of a geographic area or multiple serviceable points can be determined by the mapping computing entity 110 as the aggregate distances between the locations of the serviceable points as indicated by the map information/data and the locations of the serviceable points as indicated by the telematics information/data. As will be recognized, a variety of other approaches and techniques can be used to adapt to various needs and circumstances.

To process or evaluate the accuracy of map information/data, the mapping computing entity 110 can populate an information/data set with relevant telematics information/data, contextual information/data, and/or map information/data (Blocks 500, 505 of FIG. 5) corresponding to the specified geographic areas or serviceable points. The information/data set may include telematics information/data, contextual information/data, and/or map information/data for the appropriate geographic areas or serviceable points. Moreover, the information/data set may include map information/data, telematics information/data, and/or contextual information/data for the appropriate geographic areas or serviceable points for a specified period of time. As indicated, the specified period of time may be a time period between stops, a time period between triggers/events, a work day, and/or another specified time period—such as an hour, a day, a week, a month, and/or the like. Continuing with the previous example, the information/data set may include telematics information/data, contextual information/data, and/or map information/data for the serviceable points of 1 Street Address, Anytown, Ga. (Route 1, Stop 1); 2 Street Address, Anytown, Ga. (Route 1, Stop 2); and 3 Street Address, Anytown, Ga. (Route 1, Stop 3).

In one embodiment, an information/data record of telematics information/data may comprise a plurality of information/data fields, including latitude information/data, longitude information/data, geocode information/data, and/or the like. An information/data record of contextual information/data may comprise a plurality of information/data fields each representing contextual information/data, such as date, time, driver, vehicle, logged reason for and location of the information/data capture information/data capture, and/or the like. Thus, the information/data fields of the telematics information/data can be matched or coordinated with the information/data fields of the contextual information/data by timestamps, for example. For instance, by storing telematics information/data in association with contextual information/data, the mapping computing entity 110 may later access and retrieve information/data from the same by searching the stored information/data by serviceable point, geocode, latitude and longitude point, or any other information/data field or combination of information/data fields associated with the stored telematics information/data. In one embodiment, the telematics information/data for each serviceable point comprises a geocode or longitude and latitude point for the serviceable point. FIGS. 29A and 29B shows the information/data sets corresponding to these serviceable points. The geocode or latitude and longitude point for 1 Street Address, Anytown, Ga. may be 33.7869125, −84.3875613 based on the telematics information/data (2800 of FIG. 28). The geocode or latitude and longitude point for 2 Street Address, Anytown, Ga. may be 33.7856888, −84.3875555 based on the telematics information/data (2810 of FIG. 28). And the geocode or latitude and longitude point for 1 Street Address, Anytown, Ga. may be 33.7899999, −84.3875777 based on the telematics information/data (2820 of FIG. 28).

As one approach, the mapping computing entity 110 can determine the accuracy of the map information/data by determining the distance between the locations of the serviceable points based on the map information/data in relation to the nearest corresponding street segments. For example, the mapping computing entity 110 may determine the locations of the serviceable points on the street network by identifying the nearest corresponding street segments to the specified serviceable points. That is, the serviceable points can "snapped" to the nearest corresponding street segments based on the map information/data, for example. In one embodiment, to snap a serviceable point to the nearest corresponding street segment based on the map information/data, a perpendicular line in the appropriate direction can be created to the nearest corresponding street segment based on the map information/data. For instance, if the telematics information/data indicates that 1 Street Address, Anytown, Ga. (Route 1, Stop 1) is located at 33.7869125, −84.3875613, the mapping computing entity 110 can identify the nearest street segment to this geocode or longitude and latitude point on the corresponding street network based on the map information/data. In this example, the mapping computing entity 110 can determine or identify the nearest corresponding street segment by connecting the geocode or latitude and longitude point (33.7869125, −84.3875613) perpendicularly to the nearest corresponding street segment based on the map information/data. In this example, the geocode or latitude and longitude point (33.786913, −84.3875609) can snapped to 33.7871121, −84.3885602. The mapping computing entity 110 can perform a similar process for all serviceable points identified. For instance, as shown FIG. 29 A, the snapped location for 2 Street Address, Anytown, Ga. (Route 1, Stop 2) is 33.7814321, −84.3875222. And the snapped location for 3 Street Address, Anytown, Ga. (Route 1, Stop 3) is 33.7801234, −84.3875444. This approach can be used to avoid interpolating and reverse geocoding the locations based on the map information/data. The mapping computing entity 110 can then determine the individual distances (e.g., linear or geographical distances) between the serviceable points based on the telematics information/data and serviceable points based on the snapped locations from the map information/data. For example, the mapping computing entity 110 may determine the distance based on the Haversine Formula, the Vincenty Formula, other great-circle calculations, and/or the like. The mapping computing entity 110 can also aggregate the distances for the serviceable points to show an overall distance measure of the accuracy of the map information/data. The aggregate distance of the serviceable points in this example is 1.033 miles. This distance can presented by the mapping computing entity 110 in a variety of formats, such as a ±distance in the DD coordinate system (e.g., ±00.0000000, ±00.0000000) and/or a variety of other formats.

As another approach, the mapping computing entity 110 can determine the accuracy of the map information/data by determining the distance between the locations of the serviceable points based on the map information/data in relation to the interpolated, reverse geocoded, and similar words used herein locations based on the map information/data. For instance, the mapping computing entity 110 can access or retrieve map information/data for the three serviceable points identified for the geographic area: 1 Street Address, Anytown, Ga. (Route 1, Stop 1); 2 Street Address, Anytown, Ga. (Route 1, Stop 2); and 3 Street Address, Anytown, Ga. (Route 1, Stop 3). Based on the map information/data, the mapping computing entity can interpolate or reverse geocode the locations of the serviceable points based on the map information/data. For instance, the serviceable point for 1 Street Address, Anytown, Ga., can be interpolated or reverse geocoded to 33.7879128, −84.3885602 based on the corresponding street segments, address ranges, and/or the like from the map information/data (2805 of FIG. 28). The mapping computing entity 110 can perform a similar process for each of the identified serviceable points. For instance, as shown FIG. 29 B, the interpolated or reverse geocoded location for 2 Street Address, Anytown, Ga. (Route 1, Stop 2) is 33.7816111, −84.3875222 based on the map information/data (2815 of FIG. 28). And the interpolated or reverse geocoded location for 3 Street Address, Anytown, Ga. (Route 1, Stop 3) is 33.7809333, −84.3875444 based on the map information/data (2825 of FIG. 28). The mapping computing entity 110 can then determine the individual distances (e.g., linear or geographical distances) between serviceable points based on the telematics information/data and the interpolated or reverse geocoded locations of the serviceable points based on the map information/data. For example, the mapping computing entity 110 may determine the distance based on the Haversine Formula, the Vincenty Formula, other great-circle calculations, and/or the like. The mapping computing entity 110 can also aggregate the distances for the serviceable points to show an overall distance measure of the accuracy of the map information/data. The aggregate distance of the serviceable points in this example is 0.995 miles. This distance can presented by the mapping computing entity 110 in a variety of formats, such as a ±distance in the DD coordinate system (e.g., ±00.0000000, ±00.0000000) and/or a variety of other formats.

In addition to the above, in evaluating map accuracy, the mapping computing entity 110 can also take into account a configurable tolerance. For instance, the mapping computing may identify distances that are within a configurable tolerance travel, such as 10, 20, 40, 100, or 200 feet, and exclude them from display or accuracy determinations. This may be to account for inaccuracy in the information/data collection of the telematics information/data and/or for a variety of other reasons. Thus, if the distance between a serviceable point as indicated in the map information/data and the telematics information/data is less than fifty feet, for instance, the mapping computing entity 100 can identify the disparity as being within the configurable tolerance and exclude it from accuracy determinations. As will be recognized, a variety of other approaches and techniques can be used to adapt to various needs and circumstances.

In one embodiment, to update the map information/data of digital maps, the mapping computing entity 110 can perform the steps described in U.S. application Ser. No. 12/878,342—which is hereby incorporated in its entirety by reference. As described in U.S. application Ser. No. 12/878, 342, the mapping computing entity 110 can update digital maps by storing various attributes and location information/data for the corresponding serviceable points (referred to as serviceable addresses in the incorporated application). Updating all of the inaccuracies in the map information/data can greatly increase the usefulness and accuracy of the map information/data. However, even updating just the outliers in the map information/data, the usefulness and accuracy of the map information/data.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for determining the accuracy of map data, the method comprising:
   identifying a plurality of street segments traversed by a vehicle traveling from a first serviceable point to a second serviceable point;
   determining, by a one or more processors, an estimated distance of at least one of the plurality of street segments for traveling from the first serviceable point to the second serviceable point, the estimated distance determined based at least in part on map data;
   determining, by the one or more processors, an actual distance of the at least one of the plurality of street segments traversed by the vehicle traveling from the first serviceable point to the second serviceable point based at least in part on telematics data collected while the vehicle traveled from the first serviceable point to the second serviceable point, wherein determining the actual distance of the at least one of the plurality of street segments traveled from the first serviceable point to the second serviceable point comprises:
      identifying one or more types of travel selected from the group consisting of turn-around travel, break travel, and duplicate travel in the first plurality of street segments, and
      excluding the one or more types of travel from the actual distance for the at least one of the plurality of street segments; and
   determining, by the one or more processors, an accuracy value for the at least one of the plurality of street segments based at least in part on the difference between the estimated distance and the actual distance for the at least one of the plurality of street segments, wherein actual distance excludes the identified one or more types of travel;
   determining, by the one or more processors, whether the accuracy value satisfies a configurable inaccuracy threshold; and
   responsive to determining that the accuracy value does not satisfy the configurable inaccuracy threshold, updating, via the one or more processors, the map data to reflect the actual distance that excludes the identified one or more types of travel.

2. The method of claim 1 further comprising generating a reporting comprising street segments satisfying the configurable inaccuracy threshold.

3. The method of claim 1, wherein the configurable inaccuracy threshold is selected from the group consisting of a distance and a percentage.

4. The method of claim 1, wherein the accuracy of the map data is expressed as a percentage.

5. The method of claim 1, wherein the accuracy of the map data is expressed as a distance.

6. The method of claim 1, wherein the accuracy determination identifies one or more underages in the map data.

7. The method of claim 1, wherein the accuracy determination identifies one or more overages in the map data.

8. An apparatus comprising at least one processor and at least one memory including computer program code, the at least one memory and the computer program code configured to, with the processor, cause the apparatus to at least:
   identify a plurality of street segments traversed by a vehicle traveling from a first serviceable point to a second serviceable point;
   determine an estimated distance of at least one of the plurality of street segments for traveling from the first serviceable point to the second serviceable point, the estimated distance determined based at least in part on map data;
   determine an actual distance of the at least one of the plurality of street segments traversed by the vehicle traveling from the first serviceable point to the second serviceable point based at least in part on telematics data collected while the vehicle traveled from the first serviceable point to the second serviceable point, wherein determining the actual distance of the at least one of the plurality of street segments traveled from the first serviceable point to the second serviceable point comprises:
      identifying one or more types of travel selected from the group consisting of turn-around travel, break travel, and duplicate travel in the first plurality of street segments, and
      excluding the one or more types of travel from the actual distance for the at least one of the plurality of street segments; and
   determine an accuracy value for the at least one of the plurality of street segments based at least in part on the difference between the estimated distance and the actual distance for the at least one of the plurality of street segments, wherein actual distance excludes the identified one or more types of travel;
   determine whether the accuracy value satisfies a configurable inaccuracy threshold; and
   responsive to determining that the accuracy value does not satisfy the configurable inaccuracy threshold, update, via the one or more processors, the map data to reflect the actual distance that excludes the identified one or more types of travel.

9. The apparatus of claim 8, wherein the memory and program code are further configured to, with the processor, cause the apparatus to generate a reporting comprising street segments satisfying the configurable inaccuracy threshold.

10. The apparatus of claim 8, wherein the configurable inaccuracy threshold is selected from the group consisting of a distance and a percentage.

11. The apparatus of claim 8, wherein the accuracy of the map data is expressed as a percentage.

12. The apparatus of claim 8, wherein the accuracy of the map data is expressed as a distance.

13. The apparatus of claim 8, wherein the accuracy determination identifies one or more underages in the map data.

14. The apparatus of claim 8, wherein the accuracy determination identifies one or more overages in the map data.

15. A computer program product comprising at least one non-transitory computer-readable storage medium having computer-readable program code portions stored therein, the computer-readable program code portions comprising:

an executable portion configured to identify a plurality of street segments traversed by a vehicle traveling from a first serviceable point to a second serviceable point;

an executable portion configured to determine an estimated distance of at least one of the plurality of street segments for traveling from the first serviceable point to the second serviceable point, the estimated distance determined based at least in part on map data;

an executable portion configured to determine an actual distance of the at least one of the plurality of street segments traversed by the vehicle traveling from the first serviceable point to the second serviceable point based at least in part on telematics data collected while the vehicle traveled from the first serviceable point to the second serviceable point, wherein determining the actual distance of the at least one of the plurality of street segments traveled from the first serviceable point to the second serviceable point comprises:

identifying one or more types of travel selected from the group consisting of turn-around travel, break travel, and duplicate travel in the first plurality of street segments, and excluding the one or more types of travel from the actual distance for the at least one of the plurality of street segments; and an executable portion configured to determine an accuracy value for the at least one of the plurality of street segments based at least in part on the difference between the estimated distance and the actual distance for the at least one of the plurality of street segments, wherein actual distance excludes the identified one or more types of travel;

an executable portion configured to determine whether the accuracy value satisfies a configurable inaccuracy threshold; and an executable portion configured to, responsive to determining that the accuracy value does not satisfy the configurable inaccuracy threshold, update, via the one or more processors, the map data to reflect the actual distance that excludes the identified one or more types of travel.

16. The computer program product of claim 15 further comprising an executable portion configured to generate a reporting comprising street segments satisfying the configurable inaccuracy threshold.

17. The computer program product of claim 15, wherein the configurable inaccuracy threshold is selected from the group consisting of a distance and a percentage.

18. The computer program product of claim 15, wherein the accuracy of the map data is expressed as a percentage.

19. The computer program product of claim 15, wherein the accuracy of the map data is expressed as a distance.

20. The computer program product of claim 15, wherein the accuracy determination identifies one or more underages in the map data.

21. The computer program product of claim 15, wherein the accuracy determination identifies one or more overages in the map data.

* * * * *